(12) United States Patent
Kou et al.

(10) Patent No.: US 10,131,750 B2
(45) Date of Patent: Nov. 20, 2018

(54) POLYMER COMPOSITIONS AND USE OF THESE POLYMER COMPOSITIONS AS DISPERSANTS

(71) Applicant: BASF SE, Ludwigshafen (DE)

(72) Inventors: Huiguang Kou, Viernheim (DE);
Steffen Onclin, Neustadt (DE);
Clemens Auschra, Freiburg (DE);
Marion Nitsch, Worms Pfeddersheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/524,144

(22) PCT Filed: Nov. 4, 2015

(86) PCT No.: PCT/EP2015/075680
§ 371 (c)(1),
(2) Date: May 3, 2017

(87) PCT Pub. No.: WO2016/071386
PCT Pub. Date: May 12, 2016

(65) Prior Publication Data
US 2017/0335068 A1    Nov. 23, 2017

(30) Foreign Application Priority Data
Nov. 5, 2014 (EP) .................................. 14191887

(51) Int. Cl.
| C08G 81/02 | (2006.01) |
| C08G 63/685 | (2006.01) |
| C08G 63/91 | (2006.01) |
| C08L 67/00 | (2006.01) |
| C08G 65/332 | (2006.01) |
| C08G 65/333 | (2006.01) |
| C09D 7/65 | (2018.01) |

(52) U.S. Cl.
CPC ......... *C08G 81/025* (2013.01); *C08G 63/685* (2013.01); *C08G 63/91* (2013.01); *C08G 65/3326* (2013.01); *C08G 65/3328* (2013.01); *C08G 65/33344* (2013.01); *C08G 81/027* (2013.01); *C08L 67/00* (2013.01); *C09D 7/65* (2018.01)

(58) Field of Classification Search
CPC .............................. C08G 81/025; C09D 7/125
USPC .......................................................... 524/549
See application file for complete search history.

(56) References Cited

U.S. PATENT DOCUMENTS

| 629,638 A | 7/1899 | Wiechers |
| 4,180,644 A | 12/1979 | Marquis et al. |
| 4,191,706 A | 3/1980 | Marquis et al. |
| 4,191,835 A | 3/1980 | Habermeier et al. |
| 4,247,677 A | 1/1981 | Schmidt et al. |
| 4,260,729 A | 4/1981 | Schmidt et al. |
| 5,231,149 A | 7/1993 | Longley et al. |
| 5,420,207 A | 5/1995 | Greif et al. |
| 5,883,196 A | 3/1999 | Rath et al. |
| 8,247,353 B2 | 8/2012 | Stern |
| 2003/0212291 A1 | 11/2003 | Gajewski et al. |
| 2007/0244216 A1 | 10/2007 | Stern |
| 2012/0264610 A1 | 10/2012 | Stern |
| 2013/0274160 A1* | 10/2013 | Delbridge ............ C10M 145/24 508/287 |
| 2015/0353860 A1 | 12/2015 | Delbridge et al. |

FOREIGN PATENT DOCUMENTS

| DE | 27 02 604 A1 | 7/1978 |
| EP | 0 021 569 A1 | 1/1981 |
| EP | 0 629 638 A1 | 12/1994 |
| WO | 92/13911 A1 | 8/1992 |
| WO | 00/40630 A1 | 7/2000 |
| WO | 03/046029 A1 | 6/2003 |
| WO | 2008/107326 A1 | 9/2008 |
| WO | 2013/124830 A1 | 8/2013 |
| WO | 2013/154958 A1 | 10/2013 |
| WO | WO 2014/195440 A1 | 12/2014 |
| WO | 2015/011085 A1 | 1/2015 |
| WO | WO 2016/096816 A1 | 6/2016 |

OTHER PUBLICATIONS

International Search Report dated Jan. 7, 201 6 in PCT/EP2015/075680 filed Nov. 4, 2015.
European Search Report dated Sep. 21, 2015 in Patent Application No. 14191887.0.
International Search Report and Written Opinion of the International Searching Authority dated Jan. 7, 2016 in PCT/EP2015/075680 filed Nov. 4, 2015.
International Preliminary Report on Patentability dated May 18, 2017 in PCT/EP2015/075680 filed Nov. 4, 2015.

(Continued)

*Primary Examiner* — Hui H Chin
(74) *Attorney, Agent, or Firm* — Oblon, McClelland, Maier & Neustadt, L.L.P.

(57) ABSTRACT

A polymer composition, obtainable by reacting a) a polymer P1 having at least one functional group of the formula (I) and a polymer backbone B, and b) a polymer P2 which is a polyolefine succinic anhydride:

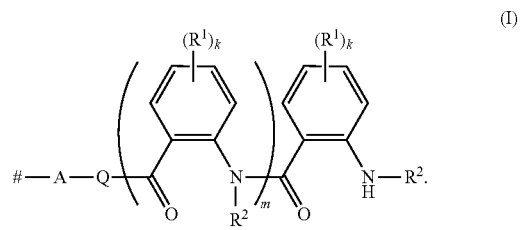

23 Claims, No Drawings

(56) References Cited

OTHER PUBLICATIONS

H. Mach, et al., "Highly Reactive Polyisobutene as a Component of a New Generation of Lubricant and Fuel Additives" Lubrication Science, vol. 11, Issue 2, Feb. 1999, pp. 175-185.
M. Tessier, et al., "Synthesis of Mono and Difunctional Oligoisobutylenes-III. Modification of α-Chlorooligoisobutylene by Reaction with Maleic Anhydride" European Polymer Journal, vol. 20, No. 3, 1984, pp. 269-280.

* cited by examiner

POLYMER COMPOSITIONS AND USE OF THESE POLYMER COMPOSITIONS AS DISPERSANTS

The present invention relates to novel polymer compositions, to a process for their manufacturing, to the use of said polymer compositions as dispersants and to liquid compositions containing solid fine particles, such as organic or inorganic pigments and fillers, and the novel polymer compositions as dispersants. The present invention also relates to the use of said polymer compositions as dispersants for pigments and fillers, and to the use as additive for liquid coating compositions.

Dispersions containing solid dispersible particles, such as organic or inorganic pigments and fillers, and polymer additives, namely dispersants, are used in an almost unlimited number of different technical applications, e.g. as coating materials, for printing inks, colouring plastic materials, including fibres, glasses, or ceramic products, for formulations in cosmetics, or for the preparation of paint systems, in particular automotive, industrial and decorative paints.

The function of polymeric dispersant in such dispersions is manifold. Mainly, they act as stabilizers for the solid fine particulate materials, i.e. the dispersant separates the particles of the solid fine particulate material and thus prevent them from coagulation or clumping and settling from the liquid phase. They also may act as solubilizers in the given carrier liquid, e.g. water or organic solvents. Polymer additives may also improve the gloss of the dispersion or enhance its rheology. Depending on the type and polarity of the dispersing agent, e.g. water, organic solvents or mixtures thereof, polymers of variable structure are chosen. In view of ecological requirements, the use of aqueous pigment dispersions is particularly preferred, as well as dispersions based on organic solvents with high solids content.

In view of the almost unlimited range of different technical applications, there remains a growing need for dispersants of improved pigment affinity and rheology behaviour, as expressed by the viscosity of the mill base at a given shear rate and improved gloss of surface coatings.

WO 92/13911A1 relates to acetoacetanilide functionalized poly(alkylene glycol)s, which are prepared by reacting a poly(alkylene glycol) monoamine, diamine or triamine with isatoic anhydride followed by acetoacetylation of the resultant aminobenzamide. WO 92/13911A1 suggests using said acetoacetanilide functionalized poly(alkylene glycol)s for preparing improved diarylide pigment compositions, which in turn are useful for preparing storage stable printing inks, especially of the publication gravure type inks.

WO 00/40630 discloses pigment dispersions containing block copolymers as dispersants prepared by the ATRP method (atom transfer radical polymerisation) of ethylenically unsaturated monomers. The block copolymers consist of defined hydrophobic and hydrophilic polymer blocks. WO 03/046029 discloses block copolymers as dispersants, which are similar to those of WO 00/40630, but which are subsequently neutralized with specific salt forming compounds.

WO 2008107326 and the literature cited therein relates to poly(alkylene imine) grafted polymers of the acrylate, polyether or polyester type, which are useful as pigment dispersants.

Polymers having pending anthranilate or anthranilamide groups, which may be attached directly or via a bivalent spacer to the polymer backbone or to the termini of the polymers have been described several times as crosslinkers or chain extenders for polyurethanes or epoxys, e.g. from the following patent documents:

Anthranilate functionalized poly(alkylene oxide)s are e.g. known from U.S. Pat. No. 4,180,644, U.S. Pat. No. 4,191,706, U.S. Pat. No. 4,191,835, U.S. Pat. No. 4,247,677, U.S. Pat. No. 4,260,729 and US 2003212291. Anthranilate functionalized poly(alkylene oxide)s are used as a crosslinker agent for polyurethane or epoxy coatings.

Anthranilate functionalized polyesters are e.g. known from EP 21569. They are used as a chain extender in the production of polyureas and polyurea-polyurethanes.

Anthranilate functionalized polycarbonates are e.g. known from U.S. Pat. No. 5,231,149. They are used for the production of graft or block copolymers having improved impact and solvent resistance.

U.S. Pat. No. 8,247,353 describes novel dispersants, which are obtained by reacting succinic anhydride resins with aliphatic polyether amines.

WO 2013/124830 describes the use of polymers having at least one pending anthranilate or anthranilamide group as dispersants for pigments in water-borne or solvent borne coating compositions.

PCT/EP2014/065606 describes polymers having at least one anthranilate or anthranilamide group, which carry a group —(C=O)—X—COY at the anthranilamide nitrogen, wherein X is a divalent moiety selected from the group consisting of optionally substituted linear $C_1$-$C_{10}$ alkylene, linear $C_2$-$C_6$ alkenylene, $C_4$-$C_7$ cycloalkylene, arylene and alkarylene and wherein Y is OH or an anthranilamide type radical.

It has now been found that polymer compositions, which are obtainable by reacting a polymer P1, which has at least one pending anthranilate or anthranilamide moiety of the formula (I) as defined hereinafter and being bound to one of the termini and/or to the backbone of a polymer backbone B of the polymer P1, with at least one polymer P2 which is a polyolefine succinic anhydride, in particular a polyisobutene succinic anhydride, have beneficial properties in that they have superior pigment affinity, show improved rheology behaviour and improved gloss of surface coatings Therefore, the present invention relates to a polymer composition, which is obtainable by reacting:

a) a polymer P1 having at least one functional group of the formula (I),

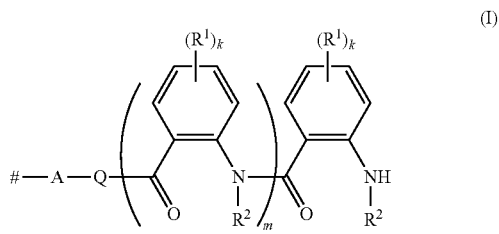

and a polymer backbone B
where
# indicates the point of attachment to the terminus and/or to the polymer backbone B of the polymer P1;
k is 0, 1, 2, 3 or 4, in particular 0 or 1, especially 0;
m is 0, 1, 2, 3, 4, 5, 6, 7, 8 or 9, in particular 0 or 1, especially 0;

A is a chemical bond or a divalent moiety selected from the group consisting of $C_1$-$C_6$ alkylene, —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), where the $C_2$-$C_6$ alkylene part is attached to Q;

Q is a divalent moiety selected from the group consisting of —O—, —NH— and —S—;

R$^1$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_{20}$ alkyl, $C_1$-$C_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, ≥NO$_2$, ≥S(=O)$_2$R$^4$, $C_1$-$C_4$ alkyl, $C_1$-$C_4$ alkoxy and halogen;

R$^2$ is selected from the group consisting of hydrogen, —S(=O)$_2$R$^4$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and hetaryl in the four last mentioned radicals are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;

R$^3$ is selected from the group consisting of hydrogen, —S(=O)$_2$R$^4$, $C_1$-$C_{20}$ alkyl, $C_3$-$C_{10}$ cycloalkyl, aryl and heteroaryl, where aryl and hetaryl are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;

R$^4$ is selected from the group consisting of OH, —NH$_2$, —NH($C_1$-$C_6$ alkyl), —N($C_1$-$C_6$ alkyl)$_2$, $C_1$-$C_4$ alkyl, $C_1$-$C_4$ alkoxy, aryl and heteroaryl, where aryl and hetaryl are unsubstituted or substituted by 1, 2, 3 or 4 radicals selected from the group consisting of $C_1$-$C_4$ alkyl, $C_1$-$C_4$ alkoxy and halogen;

with b) a polymer P2 which is a polyolefine succinic anhydride, in particular a polyisobutene succinic anhydride.

In a particular group of embodiments, the polymer P1 has at least one functional group of the formula (I), wherein #, k, m, A, R$^1$, R$^2$, R$^3$, and R$^4$ are defined as above or below and Q is O.

The present invention further relates to a process for the manufacturing of the polymer composition, which comprises reacting the polymer P1 with a polyolefine succinic anhydride, in particular a polyisobutene succinic anhydride as defined herein.

The polymers contained in the polymer compositions of the present invention, as well as their salts, act as a dispersant for fine particulate solid materials in liquid dispersions of said solid fine particulate material, i.e. they stabilize the solid particles of the solid fine particulate material in a liquid composition of the solid fine particulate material. Stabilization means that the dispersant separates the solid particles and prevents them from coagulation or clumping and settling from the liquid composition. These benefits can be achieved by the polymer compositions of the present invention even at high solids content, e.g. at concentrations of the solid particulate material of 30% by weight or more, based on the total weight of the liquid compositions. Moreover, the polymer compositions of the present invention also enhance its rheology, which is normally difficult to achieve at high solids content. The polymer compositions of the present invention also improve the gloss of a coating, which is obtained when the liquid composition containing the polymer compositions of the present invention and a solid particulate material is coated to a substrate.

Therefore, the polymer compositions of the present invention are especially useful as dispersant in liquid coating compositions containing solid fine particles, such as organic or inorganic pigments and fillers, in particular coating compositions, which, besides the polymer compositions of the present invention, contain a conventional polymer binder.

The polymer compositions of the present invention are also especially useful as dispersant for pigments and fillers, in particular in aqueous compositions, and as additive for liquid pigment-containing coating compositions, in particular as additive for aqueous pigment-containing compositions.

Without being bound to theory, it is believed that the beneficial effects are based on the following mechanisms: The modified anthranilate/anthranilamide moieties have affinity to the surface of the solid particles thereby provide a strong physical binding of the dispersant to the solid particles. The polymer part, on the other hand, can interact with the resin phase to build up a steric environment to stabilize pigment dispersion.

The present invention thus also relates to liquid compositions in the form of a dispersion, which comprise a fine particulate solid material, selected from the group consisting of pigments and fillers, a liquid diluent, wherein the fine particulate solid material is dispersed in the liquid diluent, further comprising a polymer P and/or the salts thereof as defined herein and in the claims.

The present invention also relates to liquid coating compositions, which comprise a fine particulate solid material, selected from the group consisting of pigments and fillers, a liquid diluent, wherein the fine particulate solid material is dispersed in the liquid diluent, further comprising a polymer compositions of the present invention as defined herein and in the claims and optionally a polymer binder.

The present invention further relates to the use of the novel polymer compositions of the present invention as dispersants for fine particulate solid material, selected from the group consisting of pigments and fillers.

Here and in the following, generic terms such as alkyl, cycloalkyl, alkylene, alkenylene, cycloalkylene or halogen for the variables defining the formula (I) are used. These variables have to be understood as a list of individual radicals which are representatives of the generic term.

In this context, the term $C_n$-$C_m$ indicates the possible number of carbon atoms, which the individual members of the generic terms may have.

In this context, the term "halogen" has to be understood as a halogen radical, which is generally selected from fluorine, chlorine, bromine or iodine, in particular from fluorine or chlorine.

The term "Alkyl" as used herein and the alkyl parts of —NH($C_1$-$C_6$ alkyl) and —N($C_1$-$C_6$-alkyl)$_2$ in each case denote a saturated hydrocarbon radical which may be linear or branched and which generally has from 1 to 6 carbon atoms ($C_1$-$C_6$ alkyl) and which preferably has from 1 to 4 carbon atoms ($C_1$-$C_4$ alkyl). Examples of $C_1$-$C_4$-alkyl are methyl, ethyl, n-propyl, iso-propyl, n-butyl, 2-butyl (sec-butyl), isobutyl and tert-butyl. Examples for $C_1$-$C_6$-alkyl are, apart those mentioned for $C_1$-$C_4$-alkyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Examples for $C_1$-$C_{30}$-alkyl are, apart those mentioned for $C_1$-$C_6$-alkyl, n-heptyl, 1-methylhexyl, 2-methylhexyl, 3-methylhexyl, 4-methylhexyl, 5-methylhexyl, 1-ethylpentyl, 2-ethylpentyl, 3-ethyl pentyl, n-octyl, 1-methyloctyl, 2-methylheptyl, 1-ethylhexyl, 2-ethylhexyl, 1,2-dimethylhexyl, 1-propylpentyl, 2-propylpentyl, nonyl, decyl, 2-propylheptyl, 3-propylheptyl, linear undecyl and its branched isomers, lauryl and its branched isomers, linear tridecyl and its branched isomers, myristyl and its branched isomers, palmityl and its branched isomers, stearyl and its branched isomers, eicosenyl and behenyl and its branched isomers.

The term "alkylene" (or alkanediyl) as used herein and in —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), in each case denotes an alkyl radical as defined above, wherein one hydrogen atom at any position of the carbon backbone is replaced by one further binding site, thus forming a bivalent moiety. Preferred alkylene has 2 to 6 carbon atoms, in particular 2 to 4 carbon atoms. Preferably, the two binding sites of the bivalent moiety $C_2$-$C_6$ alkylene or $C_2$-$C_4$ alkylene, respectively, are not at the same carbon atom. Examples of alkylene include methylene, 1,2-ethandiyl (=$CH_2CH_2$), 1,2-propandiyl (=$CH(CH_3)CH_2$), 1,3-propandiyl (=$CH_2CH_2CH_2$), 1-methyl-1,3-propandiyl (=$CH(CH_3)CH_2CH_2$), 2-methyl-1,3-propandiyl (=$CH_2CH(CH_3)CH_2$), 1-methyl-1,2-propandiyl (=$C(CH_3)_2CH_2$), 1,4-butandiyl (=$CH_2CH_2CH_2CH_2$), 2,2-dimethyl-1,3-propandiyl (=$CH_2C(CH_3)_2CH_2$), etc.

The term "linear alkylene" (or linear alkanediyl) as used herein denotes in each case a linear alkyl radical, wherein one hydrogen at the end of the linear carbon backbone is replaced by a further binding site. Preferred linear alkylene has 1 to 10 carbon atoms, in particular 2 to 6 carbon atoms. Examples of linear alkylene include methanediyl (=$CH_2$), 1,2-ethandiyl (=$CH_2CH_2$), 1,3-propandiyl (=$CH_2CH_2CH_2$), 1,4-butandiyl (=$CH_2CH_2CH_2CH_2$), etc.

The term "linear alkenylene" (or linear alkenediyl) as used herein denotes in each case a linear alkene radical, wherein one hydrogen atom at the end of the carbon backbone is replaced by a further binding site, thus forming a bivalent moiety. Preferred alkenylene has 2 to 6 carbon atoms, in particular 2 to 4 carbon atoms. Preferably, the alkenylene moieties have one or two double bonds, in particular one double bond. Examples are 1,2-ethendiyl, 1,3-propendiyl, 1,4-butendiyl, etc.

The term "cycloalkyl" as used herein (and in the cycloalkyl moieties of other groups comprising a cycloalkyl group, e.g. cycloalkoxy and cycloalkylalkyl) denotes in each case a mono- or bicyclic cycloaliphatic radical having usually from 3 to 10 carbon atoms ("$C_3$-$C_{10}$-cycloalkyl"), preferably 3 to 8 carbon atoms ("$C_3$-$C_8$-cycloalkyl") or in particular 3 to 6 carbon atoms ("$C_3$-$C_6$-cycloalkyl"). Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 or 8 carbon atoms comprise bicyclo[2.1.1]hexyl, bicyclo[2.2.1]heptyl, bicyclo[3.1.1]heptyl, bicyclo[2.2.1]heptyl, bicyclo[2.2.2]octyl and bicyclo[3.2.1]octyl.

The term "cycloalkylene" (or cycloalkanediyl) as used herein denotes in each case a cycloalkyl radical as defined above, wherein one hydrogen at any position of the carbon backbone is replaced by a further binding site, thus forming a bivalent moiety. Preferred cycloalkylene has 4 to 7 carbon atoms, in particular 5 to 6 carbon atoms.

Preferably, the two binding sites of the bivalent moiety $C_4$-$C_7$ cycloalkylene or $C_5$-$C_6$ cycloalkylene, respectively, are not at the same carbon atom. Examples of cycloalkylene include 1,2-cyclobutanediyl, 1,2-cyclopentanediyl, 1,2-cyclohexanediyl, etc.

The term "alkoxy" as used herein denotes in each case a straight-chain or branched alkyl group usually having from 1 to 4 carbon atoms ("$C_1$-$C_4$-alkoxy"), which is bound to the remainder of the molecule via an oxygen atom. $C_1$-$C_2$-Alkoxy is methoxy or ethoxy. $C_1$-$C_4$-Alkoxy is additionally, for example, n-propoxy, 1-methylethoxy (isopropoxy), butoxy, 1-methylpropoxy (sec-butoxy), 2-methylpropoxy (isobutoxy) or 1,1-dimethylethoxy (tert-butoxy).

The term "haloalkyl" as used herein denotes in each case an alkyl radical as defined above having 1 to 4 carbon atoms ("$C_1$-$C_4$-haloalkyl"), in particular 1 to 2 carbon atoms, wherein at least one of the hydrogen atoms of the alkyl group has been replaced by same or different halogen atoms, preferably by chloro or fluoro, in particular by fluoro. Examples of $C_1$-$C_4$-haloalkyl include but are not limited to monofluoro-, difluoro- or trifluoro-methyl, -ethyl or -propyl, for example 3,3,3-trifluoropropyl, 2-fluoroethyl, 2,2,2-trifluoroethyl, fluoromethyl, or trifluoromethyl.

The term "aryl" as used herein (and the aryl moiety in aryl-$C_1$-$C_4$-alkyl and aryloxy) in each case denotes a mono-, bi- or tricyclic hydrocarbon radical comprising at least one phenyl ring, to which one or two further saturated or unsaturated 5- or 6-membered hydrocarbon rings may be fused. Examples of aryl include phenyl, naphthyl, indanyl, indenyl, 1,2,3,4-tetrahydro-5-naphtyl, 1,2,3,4-tetrahydro-6-naphtyl, anthracenyl, 9,10-dihydroanthracen-1-yl and 9,10-dihydroanthracen-2-yl.

The term "arylene" (or arenediyl) as used herein denotes in each case an aryl radical as defined above, wherein one hydrogen at any position of the carbon backbone is replaced by a further binding site, thus forming a bivalent moiety. Preferred are 1,2-arylene radicals, where the two binding sites of arylene are located at neighboring carbon atoms. Examples of arylene include 1,2-phenylene, 1,2-naphthylene, etc.

The term "alkarylene" as used herein denotes in each case an alkyl substituted aryl radical, wherein one hydrogen at any position of the alkyl carbon backbone is replaced by a further binding site. Preferred alkarylene has 7 to 12 carbon atoms, in particular 7 to 8 carbon atoms. Examples of alkarylene include methylphenylene, ethylphenylene, 1,2-xylylene, etc.

The term "heteroaryl" as used herein (and the heteroaryl moiety in heteroaryl-$C_1$-$C_4$-alkyl) in each case denotes a mono-, bi- or tricyclic heterocyclic radical comprising at least one aromatic 5- or 6-membered heterocyclic radical having 1, 2, 3 or heteroatoms selected from N, O and S as ring members, to which one or two further saturated or unsaturated 5- or 6-membered hydrocarbon rings or heterocyclic rings having 1, 2, 3 or heteroatoms selected from N, O and S as ring members may be fused. Examples of 5- or 6-membered heterocyclic radicals (monocyclic heteroaryl), include furyl, thienyl, pyrrolyl, imidazolyl, pyrazolyl, triazolyl, oxazolyl, thiazolyl, isoxazolyl, isothiazolyl, pyridyl, pyrimidinyl, pyrazinyl, pyridazinyl and triazinyl. Examples of 5- or 6-membered heterocyclic radicals to which one or two further saturated or unsaturated 5- or 6-membered hydrocarbon rings or heterocyclic rings having 1, 2, 3 or heteroatoms selected from N, O and S as ring members are fused (bi and tricyclic heteroaryl), include, quinolinyl, quinazolinyl, quinoxalinyl, benzofuryl, benzothienyl, indolyl, indazolyl, benzimidazoly, benzoxazolyl, benzoisoxazolyl, benzoisothiazolyl etc.

The term "aryl-$C_1$-$C_4$-alkyl" denotes an aryl radical as defined herein, which is bound to the remainder via a $C_1$-$C_4$-alkylene moiety as defined herein.

The term "aryloxy" denotes an aryl radical as defined herein, which is bound to the remainder via an oxygen atom.

The term "heteroaryl-$C_1$-$C_4$-alkyl" denotes a heteroaryl radical as defined herein, which is bound to the remainder via a $C_1$-$C_4$-alkylene moiety as defined herein.

The polymers contained in the polymer composition of the present invention Suitable salts of the polymer P include alkylammonium salts such as monoalkylammonium salts, for example ethylammonium, dialkylammonium salts, for example diisopropylammonium, trialkylammonium salts, for example triethylammonium, diisopropylethylammonium or tributylammonium, as well as alkanolammonium salts such as monoalkanolammonium salts, for example ethanolammonium or 2-ammonium-2-methyl-1-propanol, N,N-dialkylalkanolammonium salts, for example N, N-dimethylethanolammonium or N,N-dimethylammoniumethylpropanol, dialkanolammonium salts, for example diethanolammonium and trialkanolammonium salts, for example triethanolammonium. Suitable salts of the polymer P include alkali metal or alkaline earth metal salts, for example sodium, potassium, lithium or calcium salts, and ammonium salts.

The remarks made below as to preferred embodiments of the variables (substituents) of the moieties of formulae (I), (IVa) and (IVb) are valid on their own as well as preferably in combination with each other. It is clear to a skilled person that for k being 2, 3 or 4, the substituent radical $R^1$ may be identical or different. It is also clear to a skilled person that for m>0 the meanings k, $R^1$ and $R^2$ in each repeating unit may be identical or different, generally, they will be identical.

The remarks made below concerning preferred embodiments of the functional groups of the formula (I) and of the polymers P1 are valid on their own as well as preferably in combination with each other concerning the polymers P1 as well as the polymer compositions obtained therefrom.

In particular the variables k, m, A, Q, $R^1$, $R^2$, X, $R^3$ and $R^4$ alone or in combination have preferably the following meanings k is 0, 1 or 2, in particular 0 or 1, especially 0;
m is 0, 1 or 2, in particular 0 or 1, especially 0;
A is a chemical bond or a divalent moiety selected from the group consisting of —C(=O)—O—($C_2$-$C_4$ alkylene) and C(=O)—NH—($C_2$-$C_4$ alkylene), where the alkylene part is attached to Q, especially a chemical bond or a divalent moiety —C(=O)—O—($C_2$-$C_4$ alkylene), where the alkylene part is attached to Q;
Q is a divalent moiety selected from the group consisting of —O— and —$NR^3$—, in particular O or NH;
$R^1$ if present, is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2R^4$, $C_1$-$C_4$ alkyl, $C_1$-$C_4$ alkoxy, halogen, phenyl and pyridyl, where the last two radicals are unsubstituted or carry a radical selected from halogen, $C_1$-$C_4$ alkyl and $C_1$-$C_4$ alkoxy;
$R^2$ is selected from the group consisting of hydrogen, $C_1$-$C_4$ alkyl and phenyl, in particular $R^2$ is hydrogen;
$R^3$ if present, is selected from the group consisting of hydrogen and $C_1$-$C_4$ alkyl;
$R^4$ if present, is selected from the group consisting of —NH$_2$, —NH($C_1$-$C_6$ alkyl), —N($C_1$-$C_6$ alkyl)$_2$ and $C_1$-$C_4$ alkyl.

In an even more preferred embodiment, the variables k and m are both 0, A and Q are as defined above and $R^2$ is hydrogen.

In a particular group of embodiments, the polymer P1 has at least one functional group of the formula (I), wherein #, k, m, A, $R^1$, $R^2$, $R^3$, and $R^4$ are defined as above and Q is O.

In a particular preferred embodiment, the variables k, m, A, Q, $R^1$, $R^2$, X, $R^3$ and $R^4$ alone or in combination have preferably the following meanings k is 0, 1 or 2, in particular 0 or 1, especially 0;
m is 0, 1 or 2, in particular 0 or 1, especially 0;
A is a chemical bond or a divalent moiety selected from the group consisting of —C(=O)—O—($C_2$-$C_4$ alkylene) and C(=O)—NH—($C_2$-$C_4$ alkylene), where the alkylene part is attached to Q, especially a chemical bond or a divalent moiety —C(=O)—O—($C_2$-$C_4$ alkylene), where the alkylene part is attached to Q;
Q is O;
$R^1$ if present, is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2R^4$, $C_1$-$C_4$ alkyl, $C_1$-$C_4$ alkoxy, halogen, phenyl and pyridyl, where the last two radicals are unsubstituted or carry a radical selected from halogen, $C_1$-$C_4$ alkyl and $C_1$-$C_4$ alkoxy;
$R^2$ is selected from the group consisting of hydrogen, $C_1$-$C_4$ alkyl and phenyl, in particular $R^2$ is hydrogen;
$R^3$ if present, is selected from the group consisting of hydrogen and $C_1$-$C_4$ alkyl;
$R^4$ if present, is selected from the group consisting of —NH$_2$, —NH($C_1$-$C_6$ alkyl), —N($C_1$-$C_6$ alkyl)$_2$ and $C_1$-$C_4$ alkyl.

In an even more preferred embodiment, the variables
k is 0,
m is 0,
A is a chemical bond or a divalent moiety selected from the group consisting of —C(=O)—O—($C_2$-$C_4$ alkylene) and C(=O)—NH—($C_2$-$C_4$ alkylene), where the alkylene part is attached to Q, especially a chemical bond or a divalent moiety —C(=O)—O—($C_2$-$C_4$ alkylene), where the alkylene part is attached to Q;
Q is O, and
$R^2$ is hydrogen.

If not stated otherwise, the polymers P1 of the present invention have at least one functional group of the formula (I), e.g. from 1 to 100, in particular from 1 to 10 or 2 to 10 or 3 to 10, functional groups of the formula (I), especially 1, 2 or 3 functional groups of the formula (I). The functional group(s) of the formula (I) may be bound either to one or more of the termini of the polymer backbone or at any other position of the polymer backbone. In a particular embodiment, the polymers P have 1, 2 or 3 functional groups of the formula (I).

In another particular embodiment, the polymer P1 has a linear or branched polymer backbone B, where the functional groups are located at the termini of the polymer backbone B.

Frequently, the polymer backbone B of the polymer P1 is selected from the group consisting of polyesters, in particular aliphatic polyesters, polyethers, in particular poly-$C_2$-

$C_4$-alkylene oxides, polycarbonates, in particular aliphatic polycarbonates, polyetheresters, in particular aliphatic polyetheresters having at least one aliphatic polyester block and at least one aliphatic polyether block such as a poly-$C_2$-$C_6$-alkylene oxide moiety, and polymers having a C—C-backbone, in particular those which comprise repeating units of polymerized monoethylenically unsaturated monomers M1 as defined hereinafter, in particular those, where the repeating units M1 are selected from polymerized $C_1$-$C_{10}$-alkyl (meth)acrylates, polymerized $C_1$-$C_{10}$-alkyl-(poly-$C_2$-$C_4$-alkyleneglycol) (meth)acrylates, and polymerized vinylaromatic hydrocarbon compounds, such as styrene, in particular those, where the amount of repeating units M1 make up from 30 to 100% by weight, based on the total weight of the polymer backbone B, in particular from 50 to 100% by weight and especially from 80 to 100% by weight, based on the total weight of the polymer backbone B.

The term "$C_1$-$C_{10}$-alkyl (meth)acrylates" as used herein refers to both the $C_1$-$C_{10}$-alkylesters of acrylic acid and to the $C_1$-$C_{10}$-alkylesters of methacrylic acid.

The term "$C_1$-$C_{10}$-alkyl-(poly-$C_2$-$C_4$-alkyleneglycol) (meth)acrylates" as used herein refers to both the esters of mono-$C_1$-$C_{10}$-alkyl-terminated poly-$C_2$-$C_4$-alkyleneglycols, in particular mono-$C_1$-$C_{10}$-alkyl-terminated polyethylene glycols, with acrylic acid and the corresponding esters with methacrylic acid.

The aforementioned polyesters, polyethers, polyetheresters, polycarbonates and polymers having a C—C-backbone are modified in that they carry at least one functional moiety of the formula (I), e.g. from 1 to 100, in particular from 1 to 10 or 2 to 10 or 3 to 10 functional groups of the formula (I), especially 1, 2 or 3 functional groups of the formula (I), where the functional moieties of the formula (I) may be bound either to one or more of the termini of the polymer backbone or at any other position of the polymer backbone. Preferably the functional groups of the formula (I) are located at the termini of the polymer backbone B.

The term "aliphatic polyether" is understood as a polyether, where the majority of the carbon atoms in the repeating units, in particular at least 90% of the carbon atoms of the repeating units in the polymer backbone are present as alkylene units, in particular $C_2$-$C_4$ alkylene units, which are linked by oxygen atoms, where the alkylene units may carry a hydroxyl group. In particular the polymer backbone of aliphatic polyethers does not contain aromatic rings, such as phenyl.

In addition to the alkylene units, in particular $C_2$-$C_4$ alkylene units, which are linked by oxygen atoms, the aliphatic polyethers may have one or more hydrocarbon groups, e.g. alkyl, cycloalkyl or alkylcycloalkyl groups, such as $C_1$-$C_{30}$ alkyl groups, $C_5$-$C_{10}$ cycloalkyl groups or $C_5$-$C_{10}$ cycloalkyl-$C_1$-$C_4$-alkyl groups. These hydrocarbon groups may be located at the termini of the aliphatic polyether chain or may be part of the backbone.

The aliphatic polyethers are linear or star-shaped. In this context, the term "linear" means that the aliphatic polyether has no or essentially no branching units and thus, the number of termini of the polymer backbone is 2. The term star-shaped means that the aliphatic polyether backbone has at least one branching site and thus has at least 3, e.g. from 3 to 10, termini.

The term "aliphatic polyesters" is understood as a polyester, where the majority of the carbon atoms in the repeating units, in particular at least 90% of the carbon atoms of the repeating units in the polymer backbone are present as alkylene units and carbonyl groups, in particular $C_2$-$C_6$ alkylene units and carbonyl groups, where the alkylene units may carry a hydroxyl group. In particular the polymer backbone of aliphatic polyesters does not contain aromatic rings such as phenyl.

The term "aliphatic polyetheresters" is understood as a block polyether-co-polyester having both at least one, e.g. 1, 2, 3 or 4 polyether block(s) and at least one, e.g. 1, 2, 3 or 4 polyester block(s). The weight ratio of the polyester blocks and the polyether blocks is usually in the range from 1:100 to 100:1 in particular in the range from 1:10 to 10:1. The majority of the carbon atoms in the polyester blocks, in particular at least 90% of the carbon atoms of the repeating units in the polyester blocks are present as alkylene units and carbonyl groups, in particular $C_2$-$C_6$ alkylene units and carbonyl groups, while the carbon atoms in the polyether blocks are present as alkylene units, in particular $C_2$-$C_6$ alkylene units or $C_2$-$C_3$ alkylene units. The alkylene units in both the aliphatic polyester blocks and the polyester blocs of the aliphatic polyetheresters may carry a hydroxyl group. In particular the polymer backbone of aliphatic polyetheresters does not contain aromatic rings such as phenyl. In a particular embodiment, the aliphatic polyetheresters have exactly one polyether block and exactly one polyester block.

The term "aliphatic polycarbonates" is understood as a polycarbonate, where the majority of the carbon atoms in the repeating units, in particular at least 90% of the carbon atoms of the repeating units in the polymer backbone are present as alkylene units and carbonyl groups, in particular $C_2$-$C_6$ alkylene units and carbonyl groups, where the alkylene units may carry a hydroxyl group. In particular the polymer backbone of aliphatic polyesters does not contain aromatic rings, such as phenyl.

With regard to their capability of acting as a dispersant, in particular as a dispersant for pigments and fillers, preference is given to polymer compositions, wherein the polymers P1 have a number average molecular weight $M_N$ in the range from 500 to 50000 Dalton, in particular from 400 to 20000 Dalton, especially from 500 to 10000 Dalton. The weight average molecular weight $M_W$ of the polymers P1 is generally in the range from 320 to 100000 Dalton, in particular from 450 to 80000 Dalton, especially from 500 to 50000 Dalton. The polydispersity $M_W/M_N$ of the polymers P1 used for preparing the polymer compositions is generally in the range from 1.05 to 5, preferably from 1.1 to 4 and especially from 1.2 to 3.

With regard to their capability of acting as a dispersant, in particular as a dispersant for pigments and fillers, preference is given to polymer compositions of the present invention, which in addition to the functional moieties of the formula (IVa) or (IVb) have one or more poly-($C_2$-$C_4$-alkyleneoxide) radicals which may be located in the polymer backbone B ore grafted onto the polymer backbone B. In these poly-($C_2$-$C_4$-alkyleneoxide) radicals, the $C_2$-$C_4$-alkyleneoxide repeating units preferably comprise at least 50% by weight ethyleneoxide repeating units. In particular, the poly-($C_2$-$C_4$-alkyleneoxide) radicals are polyethyleneoxide radicals. The number average weight of the poly-($C_2$-$C_4$-alkyleneoxide) radicals will generally be in the range from 150 to 5000 Dalton, in particular from 200 to 3000 Dalton. The poly-($C_2$-$C_4$-alkyleneoxide) radicals may carry a terminal OH group or may be "endcapped", i.e. the hydrogen atom of the terminal OH group is replaced by a hydrocarbon radical, such as $C_1$-$C_{30}$-alkyl, benzyl, $C_5$-$C_{10}$-cycloalkyl or $C_5$-$C_{10}$ cycloalkyl-$C_1$-$C_4$-alkyl, especially by a $C_1$-$C_{20}$-alkyl. A preferred endgroup of the poly-($C_2$-$C_4$-alkyleneoxide) is $C_1$-$C_{20}$ alkyl, preferably $C_1$-$C_4$-alkyl such as methyl, ethyl, n-propyl, iso-propyl, n-butyl, 2-butyl (sec-butyl), isobutyl or tert-butyl, especially methyl.

In a particular preferred embodiment of the invention, polymers P1 are used, wherein the polymer backbone B is an aliphatic polyether, in particular a poly-($C_2$-$C_4$-alkylene oxide), especially a poly(ethylene oxide), a poly(propylene oxide) or a poly(ethylene oxide-co-propylene oxide), where in the latter the ethylene oxide and propylene oxide repeating units may be arranged randomly or blockwise. The poly-($C_2$-$C_4$-alkylene oxide) carries at least one functional group of the formula (I), e.g. from 1 to 10 or from 2 to 10 or from 3 to 10 moieties of the formula (I), in particular it carries 1, 2 or 3 moieties of the formula (I). In the moieties of the formula (I), which are attached to the termini or the polymer backbone of the poly-($C_2$-$C_4$-alkylene oxide), the variable A is preferably a single bond. Q is preferably O or NH, in particular O.

Preferably, the polymer backbone B of the polymer P1 is an alkyl terminated poly-($C_2$-$C_4$-alkylene oxide) or a star shaped poly-($C_2$-$C_4$-alkylene oxide). In particular, the alkyl terminus is $C_1$-$C_{10}$ alkyl, in particular $C_1$-$C_4$-alkyl such as methyl, ethyl, n-propyl, iso-propyl, n-butyl, 2-butyl (sec-butyl), isobutyl or tert-butyl, especially methyl.

In a particular preferred embodiment, the polymer backbone B of the polymer P1 is an $C_1$-$C_{20}$ alkyl terminated poly-($C_2$-$C_4$-alkylene oxide). More preferably, the polymer P1 is a $C_1$-$C_4$ alkyl terminated poly-($C_2$-$C_4$-alkylene oxide), even more preferably a methyl terminated poly-($C_2$-$C_4$-alkylene oxide), especially a methyl terminated poly(ethylene glycol).

In a especially preferred embodiment, the polymer P1 is an methyl terminated poly(ethylene glycol) and Q is —O—.

In another particular embodiment of the invention, polymers P1 are used, wherein the polymer backbone B is an aliphatic polyester, in particular a linear or branched or hyperbranched aliphatic polyester, selected from
a) aliphatic polyesters, where the majority, in particular at least 70% of repeating units are units of the polyester backbone are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups; and
b) aliphatic polyesters, where the majority, in particular at least 70% of repeating units are units of the polyester backbone are derived from one or more, e.g. 1, 2 or 3 aliphatic $C_4$-$C_{10}$ lactones, or a combination of one or more, e.g. 1, 2 or 3 aliphatic $C_4$-$C_{10}$ lactones with at least one further component, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups.

In a further particular embodiment of the invention, polymers P1 are used, wherein the polymer backbone B is an aliphatic polyetherester, in particular a linear or branched or hyperbranched aliphatic polyetherester, selected from
a) aliphatic polyetheresters, where the majority, in particular at least 70% of repeating units are units of the polyester blocks are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise; and
b) aliphatic polyetheresters, where the majority, in particular at least 70% of repeating units are units of the polyester blocks are derived from one or more, e.g. 1, 2, or 3 aliphatic $C_4$-$C_{10}$ lactones, or a combination thereof with one or more, e.g. 1, 2 or 3 further components, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

The weight ratio of the polyester blocks and the polyether blocks is usually in the range from 1:100 to 100:1 in particular in the range from 1:10 to 10:1.

With regard to polyesters and polyetheresters, examples of aliphatic $C_2$-$C_{10}$ dicarboxylic acids include malonic acid, succinic acid, glutaric acid, 2-methylglutaric acid, 3-methylglutaric acid, adipic acid, pimelic acid, azelaic acid, sebacic acid, 2,2-dimethylglutaric acid, suberic acid and diglycolic acid.

Examples of $C_2$-$C_{10}$ aliphatic diols include ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, diethylene glycol and triethylene glycol.

Examples of $C_3$-$C_{10}$ aliphatic or $C_5$-$C_{10}$-cycloaliphatic polyols having 3, 4, 5 or 6 hydroxyl groups include glycerol, trimethylolpropane, trimethylolethane, pentaerythritol, sorbitol, innositol, pentahydroxycyclopentane, hexahydroxycyclohexane, etc.

Examples of $C_4$-$C_{10}$ lactones include, γ-butyrolactone, γ-valerolactone, δ-valerolactone, ε-caprolactone.

In a particular preferred embodiment of the invention, polymers P1 are used, wherein the polymer backbone B is an aliphatic polyesters, where the majority, in particular at least 70% of repeating units are units of the polyester backbone are derived from aliphatic $C_4$-$C_{10}$ lactones, in particular from γ-valerolactone, δ-valerolactone, ε-caprolactone or a mixture thereof.

The aliphatic polyesters carry at least one moiety of the formula (I), e.g. from 1 to 200 or from 1 to 100 moieties of the formula (I), and in particular it carries from 1 to 50 moieties of the formula (I). In the moieties of the formula (I), which are attached to the polymer backbone of the aliphatic polyester, the variable A is preferably a single bond. Q is preferably O or NH, in particular O.

In yet a further particular preferred embodiment of the invention, polymers P1 are used, wherein the polymer backbone B selected from aliphatic polyetheresters, where in the at least one polyester block the majority, in particular at least 70% of repeating units are units of the polyester block are derived from aliphatic $C_4$-$C_{10}$ lactones, in particular from γ-valerolactone, δ-valerolactone, ε-caprolactone or a mixture thereof and where the at least one aliphatic polyether block is as defined above, and where the polyether blocks are preferably poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise. The weight ratio of the polyester blocks and the polyether blocks of the polyetheresters of this particular embodiment is usually in the range from 1:100 to 100:1 in particular in the range from 1:10 to 10:1.

The polyetheresters carry at least one moiety of the formula (I), e.g. from 1 to 200 or from 1 to 100 or 1 to 50 moieties of the formula (I), and in particular they carry 1, 2, 3, or 4 moieties of the formula (I). In the moieties of the formula (I), which are attached to the terminus or to the backbone of the polyetherester, the variable A is preferably a single bond. Q is preferably O or NH, in particular O. The aliphatic polyetheresters may be linear or branched or hyperbranched.

In yet a further particular embodiment of the invention, polymers P1 are used, wherein the polymer backbone B is an aliphatic polycarbonate, in particular a linear or branched or hyperbranched aliphatic polycarbonate having a polymer backbone which is a poly-($C_2$-$C_4$-alkylene carbonate), especially a poly(ethylene carbonate), a poly(propylene carbonate) or a poly(ethylene oxide-co-propylene carbonate), where in the latter the ethylene carbonate and propylene carbonate repeating units may be arranged randomly or blockwise. The poly-($C_2$-$C_4$-alkylene carbonate) carries at least one moiety of the formula (I), e.g. from 1 to 200 or from 1 to 100 moieties of the formula (I), and in particular it carries 1, 2, 3, or 4 moieties of the formula (I). In the moieties of the formula (I), which are attached to the polymer backbone of the poly-($C_2$-$C_4$-alkylene carbonate), the variable A is preferably a single bond. Q is preferably O or NH, in particular O. The aliphatic polycarbonate may be linear or branched or hyperbranched.

In yet a further particular embodiment of the invention, polymers P1 are used, wherein the polymer backbone B essentially consists of carbon atoms, i.e. a polymer having a C—C-backbone, and wherein at least one carbon atom of the polymer backbone and/or at least one of the terminal atoms carry one or more of the functional moieties of the formula (I) as defined herein. The at least one functional moiety of the formula (I) is frequently attached to a carbon atom of the C—C-backbone within the polymer chain. However, one or more functional moieties of the formula (I) may also be attached to a terminal carbon atom of the C—C-backbone.

The polymer P1 having a C—C-backbone are hereinafter also termed polymers P1'.

According to the invention, the polymers P1' carry at least one moiety of the formula (I), e.g. from 1 to 200 or from 1 to 100 moieties of the formula (I), and in particular it carries 2 to 200 or 3 to 100 or 5 to 50 moieties of the formula (I).

In the polymers P1', the C—C-backbone is usually formed of repeating units derived from polymerized ethylenically unsaturated monomers M (hereinafter C—C repeating units). At least one of the C—C-repeating units carries a functional moiety of the formula (I) which is attached via the moiety A to a carbon atom of the C—C repeating unit, which forms part of the polymer backbone.

Principally, the monomers M forming the polymer backbone of the polymers P1' may be selected from any polymerizable ethylenically unsaturated monomers having a polymerizable C=C-double bond, provided that at least one of the monomers forming the polymer backbone carries a group of the formula (I) attached to the polymerizable C=C-double bond or at least one functional moiety of the formula (I) attached to the polymerizable C=C-double bond, which has been converted in a subsequent step into the formula (I) by a polymeric analogous reaction. Preferably, the monomers M forming the polymer backbone comprise exclusively or at least to 95%, in particular at least 99%, based on the total weight of the polymer P1 having a C—C-backbone of polymerizable ethylenically unsaturated monomers having exactly one polymerizable C=C-double bond.

Hence, the polymers P1' will comprise at least one repeating unit of the formula (Ia), where R, R' and R" represent inert radicals, such as hydrogen or $C_1$-$C_4$-alkyl, stemming from the monomer carrying the group of the formula (I) attached to the polymerizable C=C-double bond or at least one functional moiety attached to the polymerizable C=C-double bond.

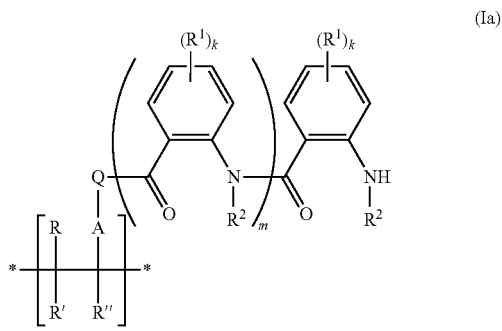

(Ia)

In formula (Ia), the variables k, m, A, Q, $R^1$, $R^2$, $R^3$ and Y are as defined above. The symbol * indicate the point of attachment to the carbon atoms of the adjacent C—C-repeating units and R, R' and R" represent inert radicals, such as hydrogen or $C_1$-$C_4$-alkyl, with particular preference given to R and R' being hydrogen and R" being hydrogen or $C_1$-$C_4$-alkyl, in particular hydrogen or methyl. In a preferred embodiment, Q is O.

In particular embodiments of polymers P1', the moiety A in formulae (I) and (Ia) is preferably a chemical bond or a divalent moiety selected from the group consisting of $C_1$-$C_6$ alkylene, —O—($C_2$-$C_6$ alkylene), —O(=O)—O—($C_2$-$C_6$ alkylene), and —$NR^3$—($C_2$-$C_6$ alkylene), where the $C_2$-$C_6$ alkylene part is attached to Q, in particular a chemical bond or a divalent moiety —C(=O)—O—($C_2$-$C_6$ alkylene), where the $C_2$-$C_6$ alkylene part is attached to Q.

In a particular embodiment of the invention the polymers P1' have, in addition to the functional moieties of the formula (I), one or more poly-($C_2$-$C_4$-alkyleneoxide) radicals which are grafted onto the polymer backbone. In these poly-($C_2$-$C_4$-alkyleneoxide) radicals, the $C_2$-$C_4$-alkyleneoxide repeating units preferably comprise at least 50% by weight ethyleneoxide repeating units. In particular, the poly-($C_2$-$C_4$-alkyleneoxide) radicals are polyethyleneoxide radicals. The number average weight of the poly-($C_2$-$C_4$-alkyleneoxide) radicals will generally be in the range from 150 to 5000 Dalton. The poly-($C_2$-$C_4$-alkyleneoxide) radicals may carry a terminal OH group or may be "endcapped", i.e. the hydrogen atom of the terminal OH group is replaced by a hydrocarbon radical such as $C_1$-$C_{10}$-alkyl, benzyl or $C_5$-$C_{10}$-cycloalkyl.

In particular, the endgroup is $C_1$-$C_{20}$ alkyl, preferably $C_1$-$C_4$-alkyl such as methyl, ethyl, n-propyl, iso-propyl, n-butyl, 2-butyl (sec-butyl), isobutyl or tert-butyl, especially methyl.

In preferred embodiments, the polymers P1' comprises repeating units, selected from polymerized monoethylenically monomers having no functional moiety of the formula (I).

Suitable monomers having no functional moiety of the formula (I) are monoethylenically unsaturated monomers including neutral non-functional monoethylenically unsaturated monomers M1 selected from the group consisting of $C_1$-$C_{10}$-alkyl esters of $C_3$-$C_6$-monocarboxylic acids, di-($C_1$-$C_{10}$-alkyl) esters of $C_4$-$C_6$-dicarboxylic acids, $C_5$-$C_{10}$-cycloalkyl esters of $C_3$-$C_6$-monocarboxylic acids, di-($C_5$-$C_{10}$-cycloalkyl) esters of $C_4$-$C_6$-dicarboxylic acids, esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with $C_3$-$C_6$-monocarboxylic acids and vinylaromatic hydrocarbon compounds (vinylaromatic hydrocarbons);

neutral and basic functional monoethylenically unsaturated monomers M2, which in addition to the polymerizable C=C-double bond include at least one neutral or basic functional group selected from a hydroxyl group, primary or secondary amino groups, a carboxamide group and a nitrile group acidic functional monoethylenically unsaturated monomers M3, which in addition to the polymerizable C=C-double bond include at least one acidic functional group selected from carboxyl and hydroxysulfonyl group.

The esters of mono-$C_1$-$C_{10}$-alkyl-terminated poly-$C_2$-$C_4$-alkyleneglycols, in particular the esters of mono-$C_1$-$C_{10}$-alkyl-terminated polyethyleneglycols, with a $C_3$-$C_6$-monocarboxylic acid, in particular with acrylic acid or methacrylic acid, usually have a molecular weight (number average) in the range from 200 to 5000 Dalton, depending on the number of $C_2$-$C_4$-alkyleneoxide repeating units.

Examples of $C_3$-$C_6$-monocarboxylic acids are acrylic acid and methacrylic acid. Examples of $C_4$-$C_6$-dicarboxylic acids are maleinic acid, fumaric acid, itaconic acid or citraconic acid. Hence, monomers M1 are in particular the aforementioned esters of acrylic acid, methacrylic acid, maleinic acid, fumaric acid, itaconic acid or citraconic acid. Examples of suitable esters M1 of acrylic acid and methacrylic acid are methyl acrylate, ethyl acrylate, n-propylacrylate, n-butyl acrylate, iso-butyl acrylate, tert-butyl acrylate, methyl methacrylate, ethyl methacrylate, propyl methacrylate, iso-butyl methacrylate, n-butyl methacrylate, tert.-butyl methacrylate, isobornyl acrylate, isobornyl methacrylate, cyclohexyl acrylate, cyclohexyl methacrylate, methylpolyethylenglycol acrylate and methylpolyethyleneglycol methacrylate.

Examples of vinylaromatic hydrocarbons M1 include styrene, vinyltoluene and α-methyl styrene, with particular preference given to styrene.

Preferred monomers M1 are selected from $C_1$-$C_{10}$-alkyl esters of acrylic acid, $C_1$-$C_{10}$-alkyl esters of methacrylic acid, esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with acrylic acid, esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with methacrylic acid and vinylaromatic hydrocarbons, in particular styrene.

Examples of suitable monomers M2 include
hydroxy-$C_2$-$C_4$-alkyl esters of $C_3$-$C_6$-monocarboxylic acids, in particular hydroxy-$C_2$-$C_4$-alkyl esters of acrylic acid or methacrylic acid, such as 2-hydroxyethyl acrylate, 2-hydroxyethyl methacrylate, 2- or 3-hydroxypropyl acrylate, 2- or 3-hydroxypropyl methacrylate, 4-hydroxybutyl acrylate and 4-hydroxybutyl methacrylate;

N-(hydroxy-$C_2$-$C_4$-alkyl) amides of $C_3$-$C_6$-monocarboxylic acids, in particular N-(hydroxy-$C_2$-$C_4$-alkyl) amides of acrylic acid or methacrylic acid, such as N-(2_hydroxyethyl) acrylamide, N-(2-hydroxyethyl) methacrylamide, N-(2- or 3-hydroxypropyl) acrylamide, N-(2- or 3-hydroxypropyl) methacrylamide, N-(4-hydroxybutyl) acrylamide and N-(4-hydroxybutyl) methacrylamide;

amino-$C_2$-$C_4$-alkyl esters of $C_3$-$C_6$-monocarboxylic acids, in particular amino-$C_2$-$C_4$-alkyl esters of acrylic acid or methacrylic acid, such as 2-aminoyethyl acrylate, 2-aminoethyl methacrylate, 2- or 3-aminopropyl acrylate, 2- or 3-aminopropyl methacrylate, 4-aminobutyl acrylate and 4-aminobutyl methacrylate;

N-(amino-$C_2$-$C_4$-alkyl) amides of $C_3$-$C_6$-monocarboxylic acids, in particular N-(amino-$C_2$-$C_4$-alkyl) amides of acrylic acid or methacrylic acid, such as N-(2-aminoethyl) acrylamide, N-(2-aminoethyl) methacrylamide, N-(2- or 3-aminopropyl) acrylamide, N-(2- or 3-aminopropyl) methacrylamide, N-(4-aminobutyl) acrylamide and N-(4-aminobutyl) methacrylamide;

primary amides of $C_3$-$C_6$-monocarboxylic acids, such as acrylamide and methacrylamide;

monoethylenically unsaturated $C_3$-$C_6$-mononitriles, such as acrylonitrile, methacrylonitrile.

Examples of suitable monomers M3 include
$C_3$-$C_6$-monocarboxylic acids such as acrylic acid and methacrylic acid;

$C_4$-$C_6$-dicarboxylic acids such as maleinic acid, fumaric acid, itaconic acid or citraconic acid;

monoethylenically unsaturated sulfonic acids, such as vinylsulfonic acid, allylsulfonic acid, methallylsulfonic acid, styrenesulfonic acid.

A particular group of embodiments of the invention relates to polymers P having a C—C-backbone, which comprises repeating units derived from monomers M1, in particular repeating units derived from monomers M1, which are selected from $C_1$-$C_{10}$-alkyl (meth)acrylates, $C_1$-$C_{10}$-alkyl-(poly-$C_2$-$C_4$-alkyleneglycol) (meth)acrylates, and polymerized vinylaromatic hydrocarbons such as styrene.

Another particular group of embodiments of the invention relates to polymers P having a C—C-backbone, which comprises repeating units derived from monomers M1, in particular repeating units derived from monomers M1, which are selected from $C_1$-$C_{10}$-alkyl (meth)acrylates, $C_1$-$C_{10}$-alkyl-(poly-$C_2$-$C_4$-alkyleneglycol) (meth)acrylates, and polymerized vinylaromatic hydrocarbons such as styrene, and repeating units derived from monomers M2, in particular from monomers M2 selected from the group consisting of hydroxy-$C_2$-$C_4$-alkyl esters of $C_3$-$C_6$-monocarboxylic acids, N-(hydroxy-$C_2$-$C_4$-alkyl) amides of $C_3$-$C_6$-monocarboxylic acids, amino-$C_2$-$C_4$-alkyl esters of $C_3$-$C_6$-monocarboxylic acids and N-(amino-$C_2$-$C_4$-alkyl) amides of $C_3$-$C_6$-monocarboxylic acids.

Amongst polymers P having a C—C-backbone, particular preference is given to those, where the repeating units derived from monomers M1 make up from 10 to 90% by weight, in particular from 30 to 80% by weight of the polymer P having a C—C-backbone.

Particularly preferred polymers P1' comprise
10 to 90% by weight, in particular from 30 to 80% by weight of the polymer P having a C—C-backbone of repeating units derived from monomers M1;
10 to 80% by weight, in particular from 20 to 60% by weight of the polymer P having a C—C-backbone of repeating units of the formula (Ia);
0 to 80% by weight, in particular from 0 to 50% by weight of the polymer P having a C—C-backbone of repeating units derived from monomers M2;

0 to 20% by weight, in particular from 0 to 10% by weight of the polymer P having a C—C-backbone of repeating units derived from monomers M3.

Preference is given to polymers P1', which have a number average molecular weight $M_N$ in the range from 500 to 50000 Dalton, in particular from 800 to 30000 Dalton, especially from 1000 to 20000 Dalton. The weight average molecular weight $M_W$ of the polymers P''' is generally the range from 600 to 150000 Dalton, in particular from 1000 to 50000 Dalton, especially from 1200 to 30000 Dalton. The polydispersity $M_W/M_N$ is generally in the range from 1.05 to 5, preferably from 1.1 to 4 and especially from 1.2 to 3.

The polymer composition according to the present invention is obtainable by reacting a polymer P1 with a polymer P2, which is a polyolefine succinic anhydride, in particular a polyisobutene succinic anhydride.

The term "polyolefine succinic anhydride" is understood as meaning oligomeric or polymeric macromolecules having an oligomer radical or polymer radical, respectively, which is derived from an olefin, in particular an olefin having 2 to 12 carbon atoms—hereinafter termed $C_2$-$C_{12}$-olefine—and which has, on one of its termini, 1 or 2 radicals derived from succinic anhydride.

Polyolefine succinic anhydride can therefore be described by the following formulae (Va) and (Vb):

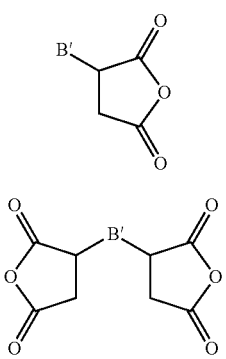

(Va)

(Vb)

where B' in formula (Va) is a monovalent oligomer radical or polymer radical derived from a polyolefine, in particular from polyisobutene, and B' in formula (Vb) is a divalent oligomer radical or polymer radical derived from a polyolefine, in particular from polyisobutene.

Preference is given to those polyolefine succinic anhydrides, which comprise less than 20% by weight of polyolefine succinic anhydride with 2 succinic anhydride groups per polyolefine radical, i.e. polyolefine succinic anhydride of formula (Vb).

Polymer radicals derived from an olefin, herein below also polyolefine radicals, are understood as meaning organic radicals which are derived from linear or branched oligomers or polymers of an olefin, in particular from a $C_2$-$C_{12}$-olefine, such as ethylene, propene, 1-butene, isobutene, 1-pentene, 1-hexene, 1-octene, diisobutene, 1-decene, 1-dodecene or diisobutene.

Preferably, B' in formulae (Va) and (Vb) is a polymer radical derived from isobutene. Polymer radicals derived from isobutene, hereinbelow also polyisobutenyl radicals, are understood as meaning organic radicals which are derived from linear or branched oligomers or polymers of isobutene and which can comprise, polymerized therein, up to 20% by weight, preferably not more than 10% by weight, of $C_2$-$C_{12}$-olefins different from isobutene, such as 1-butene, 2-butene, 2-methyl-1-butene, 2-methylpentene-1,2-methylhexene-1,2-ethylpentene-1,2-ethylhexene-1,2-propylheptene-1. Radicals of this type can be described in the case of monovalent radicals PIB for example by the following formulae

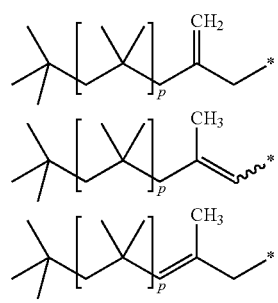

and in the case of divalent radicals PIB', for example by the following formulae

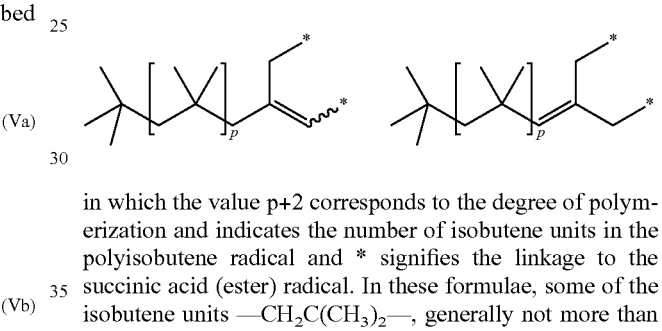

in which the value p+2 corresponds to the degree of polymerization and indicates the number of isobutene units in the polyisobutene radical and * signifies the linkage to the succinic acid (ester) radical. In these formulae, some of the isobutene units —$CH_2C(CH_3)_2$—, generally not more than 20% by weight, preferably not more than 10% by weight, can be replaced by $C_2$-$C_{12}$-alkane-1,2-diyl groups derived from $C_2$-$C_{12}$-olefins which are different therefrom. The degree of polymerization p+2 is typically in the range from 5 to 100, in particular in the range from 8 to 80 and specifically in the range from 15 to 65.

Preference is given to those polyolefine succinic anhydrides which have a number-average molecular weight in the range from 300 to 10000, in particular in the range from 500 to 5000, especially from 800 to 4000. Particular preference is given to those polyisobutene succinic anhydrides whose polyisobutene radical of the ester has a number-average molecular weight in the range from 300 to 10000, in particular in the range from 500 to 5000, especially from 800 to 3600.

In a specific embodiment of the invention, the polyolefine radicals of the polyolefine succinic anhydride P2, in particular the polyisobutene radicals of the polyisobutene succinic anhydrides have a narrow molecular weight distribution. The polydispersity is then preferably at most 1.4, particularly preferably at most 1.3, in particular at most 1.2. Polydispersity is understood as meaning the quotient of weight-average molecular weight $M_w$ and number-average molecular weight $M_n$ (PDI=$M_w/M_n$).

Preference is given to those polyolefine succinic anhydrides which have a saponification number in the range from 10 to 300 mg KOH/g. The saponification number of the polyolefine succinic anhydride is determined analogously to DIN 53401. It is a measure of the relative fraction of polymers of formulae (Va) and (Vb) in the polyolefine succinic anhydride. For the properties of the polymer composition of the invention, it has proven to be advantageous if the polyolefine succinic anhydride has a saponification number SN in the range from 40 to 140 mg KOH/g and in particular in the range from 70 to 100 mg KOH/g, determined in accordance with DIN 53401.

Preference is given to those polymer compositions, wherein the polymer P1 and the polymer P2 are reacted in a relative amount such that the molar ratio of functional groups of the formula (I) to the succinic anhydride groups in polymer P2 is in the range from 0.1:1 to 10:1, in particular from 0.5:1 to 2:1.

The reaction of the polymer P1 with the polymer P2 can be performed by analogy to the reaction of polymers having a succinic anhydride moiety with primary or secondary amines.

The reaction of the polymer P1 with the polymer P2 is frequently performed in the presence of a suitable catalyst which promotes the reaction of the primary or secondary amino group $NHR^2$ of the functional groups of the formula (I) with the anhydride group in the polymer P2. Suitable catalysts include alkalimetal hydroxides, such as sodium or potassium hydroxide, alkalimetal carbonates, such as sodium or potassium carbonate, tertiary amines, e.g. tri-$C_1$-$C_6$-alkylamines, such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines, such as dimethylcyclohexylamine, di-$C_1$-$C_6$-alkylpyridines, such as 4-dimethylaminopyridine, tin compound catalysts, such as dibutyltindioctoate and dibutyltindilaurate. The amount of catalyst is generally from 0.01 to 2% by weight, in particular from 0.1 to 1% by weight, based on the total amount of polymer P1 and polymer P2.

The reaction of the polymer P1 with the polymer P2 is generally performed at temperatures ranging from 40 to 180° C., in particular from 60 to 160° C. Reaction temperatures below 100° C. will favor the formation of moieties of the formula (IVa) while higher reaction temperatures will favour the formation of moieties of the formula (IVb).

The reaction of the polymer P1 with the polymer P2 may be performed in bulk or in solvent. Suitable solvents are those which are inert under the used reaction conditions, examples including esters, hydrocarbons and mixtures thereof. Preferably, the reaction is performed in bulk, i.e. the concentration of the reactants is at least 90% by weight, based on the weight of the reaction mixture.

The reaction of the polymer P1 with the polymer P2 can be carried out under reduced, normal or elevated pressure. Generally, atmospheric pressure is preferred.

The polymer composition of the present invention contain, which are obtainable by the reaction of the polymer P1 with the polymer P2, preferably as a major constituent polymers, which have one or more, e.g. 1 to 10, moieties of the formula (IVa) or (IVb)

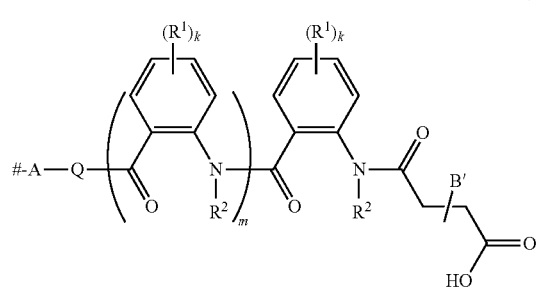

(IVa)

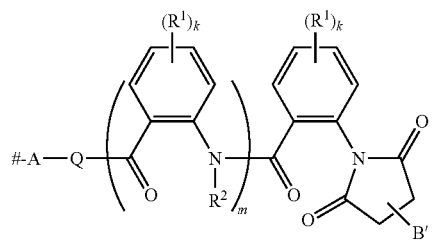

(IVb)

where k, m, A, Q, $R^1$ and $R^2$ are as defined herein and where
# indicates the point of attachment to the terminus and/or to the polymer backbone B
B' is a polyolefine radical, in particular a polyisobutene radical, attached to one of the two $CH_2$ moieties.

In a preferred embodiment, Q is O.

It is apparent to a skilled person that moieties of the formula (IVb) will be formed only, if $R^2$ is hydrogen.

Preference is given to those polymer compositions, which, based on the total weight of the polymer compositions, consist to at least 50% by weight, in particular to at least 70% by weight, of polymers having moieties of the formulae (IVa) or (IVb). In a particular group of embodiments of the invention, the polymer compositions comprise, based on the total weight of the polymers having functional moieties of the formulae (IVa) or (IVb), more than 30% by weight, in particular more than 50% by weight, of polymers having functional moieties of the formula (IVa). In another particular group of embodiments of the invention, the polymer compositions comprise, based on the total weight of the polymers having functional moieties of the formulae (IVa) or (IVb), more than 30% by weight, in particular more than 50% by weight, of polymers having functional moieties of the formula (IVb).

As a consequence of the preparation of the polyolefine succinic anhydride, the polymer composition may comprise unmodified polyolefine and non-reacted polymer P1. The fraction of polyisobutene may constitute up to 30% by weight, but preferably not more than 20% by weight or not more than 10% by weight, based on the total weight of the polymer composition. The fraction of non-reacted polymer P1 may constitute up to 30% by weight, but preferably not more than 20% by weight or not more than 10% by weight, based on the total weight of the polymer composition. The total amount of non-reacted polymer P1 and unmodified polyolefine will generally not exceed 50% by weight of the polymer composition in particular 30% by weight of the polymer composition.

With regard to their capability of acting as a dispersant, in particular as a dispersant for pigments and fillers, preference is given to polymer compositions of the present invention, which are characterized by an acid number in the range from 3 to 500 mg KOH per gram of the polymer composition, in particular from 10 to 300 mg KOH per gram of the polymer composition. In other particular groups of embodiments, the polymer compositions of the present invention are characterized by an acid number in the range from 0 to 10 mg KOH per gram of the polymer composition, in particular from 0 to 5 mg KOH per gram of the polymer composition.

Polymers P1 and methods for their preparation are known from WO 2013/124830, to which full reference is made. Polymers P1, which are aliphatic polyethers, in particular poly(alkylene oxides) are also known from U.S. Pat. No. 4,180,644, U.S. Pat. No. 4,191,706, U.S. Pat. No. 4,191,835, U.S. Pat. No. 4,247,677, U.S. Pat. No. 4,260,729 and US 2003212291. Polymers P1, which are aliphatic polyesters are also known from EP 21569. Polymers P1, which are aliphatic polycarbonates are also known from U.S. Pat. No. 5,231,149.

Apart from that, polymers P1 can be obtained by reacting a polymer P' having at least one functional moiety of the formula A-Q-H attached to one of the termini and/or to the backbone of the polymer P' with a compound of the formulae (II) or (III)

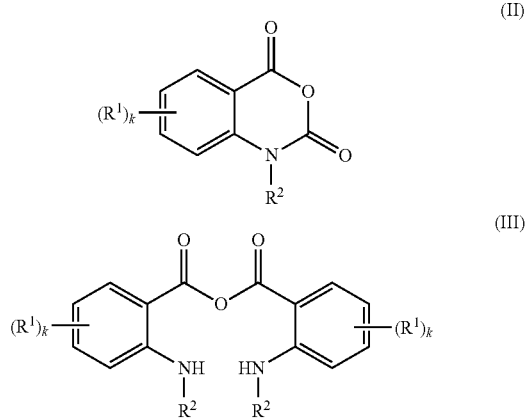

where A, Q, k, $R^1$ and $R^2$ are as defined herein and where the polymer P' does not have a functional group of the formula (I). In a preferred embodiment, Q is O.

Examples of suitable compounds of the formula (II) are isatoic anhydride, N-methylisatoic anhydride, N-ethylisatoic anhydride, aminoisatoic anhydride, fluoroisatoic anhydride, chloroisatoic anhydride, bromoisatoic anhydride, carboxylic isatoic anhydride, nitroisatoic anhydride, hydroxyisatoic anhydride, methoxyisatoic anhydride, 1-(methylsulfonylmethyl)isatoic anhydride, (4-pyridinyl) isatoic anhydride, 1-phenyl-2H-3,1-benzoxazine-2,4(1H)-dione, chloro-1-ethyl (methyl)-2H-3,1-benzoxazine-2,4 (1H)-dione, isatoic anhydride carboxylic acid methyl ester.

Examples of suitable compounds of the formula (III) are isatoic acid anhydride (anhydride of anthranilic acid).

Polymers P1 may also be prepared by reacting a polymer P' having at least one functional moiety of the formula A-Q-H attached to one of the termini and/or to the backbone of the polymer P' with a anthranilic acid or an ester thereof of the formulae (II')

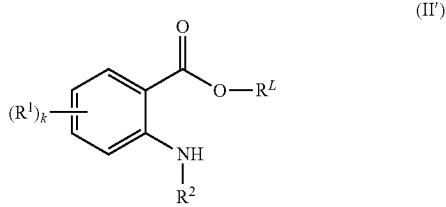

where A, Q, k, $R^1$ and $R^2$ are as defined herein and where the polymer P' does not have a functional group of the formula (I) and wherein $R^L$ is hydrogen or a hydrocarbon radical having 1 to 8 carbon atoms such as $C_1$-$C_6$-alkyl, phenyl, $C_3$-$C_6$-cycloalkyl or benzyl and wherein $R^L$ is preferably hydrogen or $C_1$-$C_4$-alkyl, especially hydrogen, methyl or ethyl. In a preferred embodiment, Q is O.

The polymer P' forms the backbone B of the polymer P1. Hence, the polymer P' is preferably selected from the group consisting of polyesters, in particular aliphatic polyesters, polyethers, in particular poly-$C_2$-$C_4$-alkylene oxides, polycarbonates, in particular aliphatic polycarbonates, polyetheresters, in particular aliphatic polyetheresters having at least one aliphatic polyester block and at least one aliphatic polyether block such as a poly-$C_2$-$C_6$-alkylene oxide moiety, and polymers having a C—C-backbone, in particular those which comprise repeating units of polymerized monoethylenically unsaturated monomers M1 as defined hereinafter, in particular those, where the repeating units M1 are selected from polymerized $C_1$-$C_{10}$-alkyl (meth)acrylates, polymerized $C_1$-$C_{10}$-alkyl-(poly-$C_2$-$C_4$-alkyleneglycol) (meth)acrylates, and polymerized vinylaromatic hydrocarbon compounds, such as styrene, in particular those, where the amount of repeating units M1 make up from 30 to 100% by weight, based on the total weight of the polymer P', in particular from 50 to 100% by weight and especially from 80 to 100% by weight, based on the total weight of the polymer P'.

The reaction of the polymer P' with the compound of formulae (II), (II') or (III) is generally performed in the presence of a suitable catalyst which promotes the reaction of the groups A-Q-H with the carbonyl groups in (II) or (III). Suitable catalysts include alkalimetal hydroxides, such as sodium or potassium hydroxide, alkalimetal carbonates, such as sodium or potassium carbonate, tertiary amines, e.g. tri-$C_1$-$C_6$-alkylamines, such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines, such as dimethylcyclohexylamine, di-$C_1$-$C_6$-alkylpyridines such as 4-dimethylaminopyridine, tin compound catalysts, such as dibutyltindioctoate and dibutyltindilaurate.

The amount of catalyst is generally from 0.01 to 2% by weight, in particular from 0.1 to 1% by weight, based on the total amount of polymer P' and the compound of formulae (II) or (III).

The reaction of the polymer P' with the compound of formulae (II), (II') or (III) is generally performed at temperatures ranging from 60 to 180° C., in particular from 70 to 140° C.

The reaction of the polymer P' with the compound of formulae (II), (II') or (III) may be performed in bulk or in solvent. Suitable solvents are those with are inert under reaction conditions, examples including esters, hydrocarbons and mixtures thereof. Preferably, the reaction is performed in bulk, i.e. the concentration of the reactants is at least 90% by weight, based on the weight of the reaction mixture.

The polymers P1 may be isolated from the reaction of the polymer P' with the compounds of formulae (II), (II') or (III). It is, however, also possible to prepare the polymer P1 in a first step and then reacting the thus obtained reaction product with the polymer P2.

Polymers P2 are also known from prior art, e.g. from DE 2702604 A1, U.S. Pat. No. 5,883,196, U.S. Pat. No. 5,420,207 and EP 629638, and also the publication by M. Tessier et al., Eur. Polym. J, 20, 1984, p. 269-280 and H. Mach et al., Lubrication Science 12-2, 1999, p. 175-185.

Particular preference is given to polyolefine succinic anhydrides, in particular to polyisobutene succinic anhydrides, as polymers P2, which are obtainable by reacting olefinically unsaturated polyolefines, in particular olefinically unsaturated polyisobutenes, with maleic anhydride. Particular preference is given to products which are obtained by reacting highly reactive polyisobutenes with maleic anhydride. Highly reactive polyisobutenes are understood as meaning polyisobutenes with at least 50 mol %, often with at least 60 mol % and in particular with at least 80 mol %, based on the total number of polyisobutene macromolecules, of terminally arranged double bonds. The terminally arranged double bonds may either be vinyl double bonds [—CH=C(CH$_3$)$_2$] (β-olefin) or vinylidene double bonds [—CH—C(=CH$_2$)—CH$_3$] (α-olefin). Preferred highly reactive polyisobutenes have predominantly vinylidene double bonds. Highly reactive polyisobutenes are commercially available, e.g. the Glissopal® grades from BASF SE, thus e.g. Glissopal® 1000 and Glissopal® 1300, Glissopal® 2300.

As pointed out above, the polymer compositions, which are obtainable by reacting the polymer P1 with the polymer P2 are particularly suitable as dispersants, in particular as dispersants for fine particulate solids such as pigments and fillers.

The invention also relates to liquid compositions of fine particulate solids, which contain a polymer composition, which is obtainable by reacting the polymer P1 with the polymer P2 as a dispersant.

In this case, preferred liquid compositions are aqueous compositions.

The polymer compositions, which are obtainable by reacting the polymer P1 with the polymer P2, can be used as dispersant in a broad application fields, such as coatings, inks, electronic materials, especially in low temperature and low viscosity applications. The polymer compositions of the present invention can be used in solvent based systems, such as in solvent based organic and inorganic pigments dispersion e.g. in alkyd, CAB (cellulose acetate butyrate), UV (Ultraviolet) and TPA (thermoplastic acrylate) paint systems, in general industrial coatings especially in automotive coatings, as well as in printing inks and graphic arts.

The invention relates in particular to liquid compositions in the form of a dispersion comprising a fine particulate solid material, in particular a pigment or filler, which is dispersed in a liquid diluent, which composition further contain a polymer compositions of the present invention as defined herein.

Preferably, the liquid compositions in form of a dispersion are aqueous compositions.

Thus, the invention relates also to the use of the polymer composition according to the invention as dispersant for pigments and fillers in liquid compositions, in particular in aqueous compositions.

The invention relates in particular to liquid compositions in the form of a liquid coating composition, which comprises a fine particulate solid material, in particular a pigment or filler, which is dispersed in a liquid diluent, which compositions further contain a polymer compositions of the present invention as defined herein and a binder polymer or prepolymer.

Thus, the invention relates also to the use of the polymer composition according to the invention in liquid pigment-containing coating compositions, preferably as an additive in liquid pigment-containing coating compositions in particular in aqueous pigment-contain coating compositions.

An aqueous composition usually contains water as solvent. If the aqueous composition contains further external solvents, water is usually the major solvent.

The invention also relates in particular to liquid compositions in the form of a liquid ink composition, which comprises a fine particulate solid material, in particular a pigment or filler, which is dispersed in a liquid diluent, which compositions further contain a polymer compositions of the present invention as defined herein and a binder polymer or prepolymer.

The polymers contained in the polymer composition of the present invention may have carboxyl groups, which can be neutralized. Therefore, the polymer composition of the present invention can be used in their acidic form or in a neutralized form, rendering the acidic polymer constituents contained in the polymer composition into their corresponding salts. Suitable salts are base addition salts resulting from the partial or complete neutralization of the acidic polymer constituents with organic or inorganic bases. Preferably, the degree of neutralization is in the range of from 5 to 100%.

Examples of suitable organic bases for the partial or complete neutralization of the polymer P include alkylamines, such as monoalkylamines, for example ethylamine, dialkylamines, for example diisopropylamine, trialkylamines, for example triethylamine, diisopropylethylamine or tributylamine, as well as alkanolamines, such as monoalkanolamines, for example ethanolamine or 2-amino-2-methyl-1-propanol, N,N-dialkylalkanol amines, for example N, N-dimethylethanolamine or N,N-dimethylaminomethylpropanol, dialkanolamines, for example diethanolamine and trialkanolamines, for example triethanolamine. Preferred organic bases are 2-amino-2-methyl-1-propanol, ethanolamine, triethylamine and tributylamine.

Examples of suitable inorganic bases for the partial or complete neutralization of the polymers contained in the polymer compositions are alkali metal or alkaline earth metal hydroxides, for example sodium, potassium, lithium or calcium hydroxide, alkali metal or alkaline earth metal carbonates, for example sodium, potassium or calcium carbonate, and ammonia. Preferred inorganic bases are sodium hydroxide, potassium hydroxide, lithium hydroxide and ammonia.

Suitable solid fine particular materials include but are not limited to the group consisting of pigments and fillers. Pigments may be inorganic or organic. Pigments included colored pigments and pearlescents.

The size of the fine particulate material is preferably in the micrometer range, e.g. the weight average particle diameter may range from 1 μm to 2000 μm, in particular form 2 μm to 1000 μm or from 5 μm to 500 μm. The weight average particle diameter may be determined by sieving analysis. The weight average particle diameter may be also be determined by light scattering methods.

Examples of suitable organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" 2$^{nd}$ *Edition,* 1995, VCH Verlagsgesellschaft, ISBN: 3-527-28744-2.

Examples of suitable inorganic pigments are e.g. metallic flakes, such aluminium, aluminium oxide, calcium carbonate, silicon oxide and silicates, iron(III)oxide, chromium(III) oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

Suitable fillers are calcium carbonate, silicates, glass fibres, glass beads, talc, kaolin, mica, barium sulphate, metal oxides and hydroxides, carbon black, graphite, wood powders, powders and fibres of other natural products, synthetic fibres.

The liquid diluent present in the dispersion will depend on the field of application in a known manner. The dispersants of the invention are particular useful in dispersions, where the diluent is selected from commonly used solvents in coatings technology. For water based formulations the diluent comprises water and may, aside from water, further comprise polar, water-miscible solvents such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. For solvent based formulations, preferably less polar solvents like aliphatic hydrocarbons, esters like butyl acetate, or glycol ethers like methoxypropylene glycol or glycol ether esters like methoxypropylene glycol acetate are used and mixtures thereof are used as liquid diluents.

Preferably, the dispersions are aqueous dispersions comprising water as major solvent.

Preferably, the weight ratio of fine particulate solid material to the polymer constituents thereof in the liquid composition may range from 100:1 to 1:50, in particular from 30:1 to 1:10.

In a particular embodiment of the invention, the liquid composition comprises
  i) 1 to 70% by weight, in particular 2 to 50% by weight, based on the total weight of the liquid composition, of at least one fine particulate solid material, selected from the group consisting of pigments and fillers;
  ii) 0.1 to 50% by weight, frequently 0.5 to 50% by weight, in particular from 1 to 30% by weight, based on the total weight of the liquid composition, of at least one polymer P as defined herein optionally in the form of a salt;
  iii) 0 to 98.5% by weight, frequently 10 to 98.5% by weight, in particular from 20 to 97% by weight, based on the total weight of the liquid composition, of at least one liquid diluent.

Depending on the intended use, the liquid composition may further comprise binders and/or one or more conventional additives depending on the intended use. Conventional additives included e.g. plasticisers, lubricants, emulsifiers, humectants, rheology additives, catalysts, flow auxiliaries, optical brighteners, flame retardants, preservatives, antistatic agents or blowing agents.

Preferably, liquid dispersions are aqueous dispersions comprising water as major solvent.

The liquid dispersion may be in the form of a mill base. Such a millbase contains the fine particulate solid, the polymer composition of the invention and optionally a liquid diluent and optionally additives but generally mill base will not contain binders.

The liquid dispersion may also be in the form of a coating composition. Such a coating composition contains the fine particulate solid, the polymer P and the salts thereof and the liquid diluent and additionally one or more binders, e.g. film-forming polymers or prepolymers which form a film upon curing. Coating composition may optionally contain conventional additives conventionally used in coating technology, e.g. plasticisers, lubricants, emulsifiers, rheology additives, catalysts, flow auxiliaries, optical brighteners, flame retardants, preservatives, antistatic agents or blowing agents.

The liquid dispersion may also be in the form of an ink, e.g. a printing ink or a gravure ink. Such an ink contains the fine particulate solid, the polymer P and the salts thereof and the liquid diluent and additionally one or more binders conventionally used in ink technology, e.g. film-forming polymers or prepolymers which form a film upon curing. Coating composition may optionally contain conventional additives, e.g. plasticisers, lubricants, emulsifiers, humectants, rheology additives, humectants, preservatives and antistatic agents.

Suitable binders are the ones customarily used, for example the ones described in *Ullmann's Encyclopedia of Industrial Chemistry*, 5th Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying resins can be used. Binders may also be derived from polyvinylalcohol and polyvinylbutyral.

If cold- or hot-curable binders are used, the addition of a curing catalyst may be advantageous. Suitable catalysts that accelerate the curing of binders are described, for example, in *Ullmann's, Vol. A*18, loc. cit., p. 469.

Preference is given to coating compositions comprising a polymer P and the salts thereof and a cross linkable resin. Examples of coating compositions containing specific binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a trisalkoxycarbonyl triazine cross linker and a hydroxyl group containing resin, such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

Preferred coating compositions are aqueous coating compositions.

The coating composition preferably comprises 0.01 to 100.0 parts by weight of the combined components i) and ii), i.e. fine particulate solid and polymer P and the salts thereof in the composition, in particular 0.05 to 50.0 parts, especially 0.1 to 20.0 parts, per 100 parts by weight of solid binder.

For preparing the liquid composition of the invention, the pigments are generally dispersed in the liquid diluent in the presence of the polymer P and the salts thereof. The dispersion can be achieved by using conventional techniques, such as high speed mixing, ball milling, sand grinding, attritor grinding or two or three roll milling. The resulting pigment dispersion may have a pigment to dispersant weight ratio in the above range. The thus obtained dispersion is also termed as a mill-base.

For preparing the coating composition or an ink the mill-base will generally be incorporated, e.g. by mixing, into a liquid composition of the binder. It is, however, also possible to disperse the fine particulate solid, in a solution of the polymer P and the salts thereof, concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of fine particulate solid and polymer P and the salts thereof is easy to disperse and does not require time and energy intensive grinding to be incorporated into e.g. a paint formulation.

The invention is hereinafter also described by way of examples.

PREPARATION EXAMPLES

TABLE 1

Commercially available polymers used:

| Name of Polymer | Composition | Supplier |
|---|---|---|
| Pluriol ® A350 E | Methyl polyethylene glycol, molecular mass $M_N$ approx. 350 g/mol | BASF SE |
| Pluriol ® A500 E | Methyl polyethylene glycol, molecular mass $M_N$ approx. 500 g/mol | BASF SE |
| Lutensol AT 11 | $C_{16-18}$-fatty alcohol ethoxylate with 11 EO units | BASF SE |

TABLE 1-continued

Commercially available polymers used:

| Name of Polymer | Composition | Supplier |
|---|---|---|
| Pluronic PE3500 | poly(ethyleneoxide-co-propyleneoxide) triblock copolymer with a central polypropyleneoxide block, molecular weight $M_N$ approx. 3800 | BASF SE |
| Pluriol A15 TE | ethoxylated trimethylolpropane molecular weight $M_N$ approx. 840 | BASF SE |
| Glissopal SA F | Polyisobutene succinic anhydride, molecular weight $M_N$ approx. 1000 | BASF SE |

Example 1

A mixture of 50.0 g (0.1 mol OH) of Pluriol® A500 E, 16.3 g (0.1 mol) of isatoic anhydride (IA) and 0.2 g (0.3 wt.-%) of 1,4-Diazabicyclol[2.2.2]octan was heated at 80 to 140° C. until no more carbon dioxide was evolved. Then, the reaction mixture was cooled to 80° C. and 100.0 g (0.1 mol) Glissopal SA F was added and the reaction mixture was heated at 80° C. for additional 3 hours. The obtained product was a viscous liquid with an acid number of 35 mg KOH/g.

Example 2

A mixture of 74.0 g (0.1 mol OH) of Lutensol® AT11, 16.3 g (0.1 mol) of isatoic anhydride (IA) and 0.28 g (0.3 wt.-%) of 1,4-Diazabicyclol[2.2.2]octan was heated at 80 to 140° C. until no more carbon dioxide was evolved. Then, the reaction mixture was cooled down to 80° C. and 100.0 g (0.1 mol) Glissopal SA F was added and the reaction mixture was heated at 80° C. for additional 3 hours. The obtained product was a wax with an acid number of 30 mg KOH/g.

Example 3

A mixture of 35 g (0.1 mol) of Pluriol® A350E, 45.6 g (0.4 mol) of epsilon-caprolactone and 10.0 g (0.1 mol) of delta-valerolactone was treated with 0.1 g of dibutyltin dilaurate under inert gas and heated to 160° C. until a solids content of 97% had been reached. The reaction mixture was cooled down to 60° C. and 16.3 g (0.1 mol) of isatoic anhydride and 0.31 g (0.3 wt.-%) of 1,4-Diazabicyclol [2.2.2]octan was added and cooked at 80 to 140° C. until no more carbon dioxide was evolved. Then, the reaction mixture was cooled down to 80° C. and 100.0 g (0.1 mol) Glissopal SA F was added and the reaction mixture was heated at 80° C. for additional 3 hours. The obtained product was a wax with an acid number of 27 mg KOH/g.

Example 4

A mixture of 80.0 g (0.2 mol OH) of Pluriol E800, 32.6 g (0.2 mol) of isatoic anhydride (IA) and 0.31 g (0.3 wt.-%) of 1,4-Diazabicyclol[2.2.2]octan was heated at 80 to 140° C. until no more carbon dioxide was evolved. Then, the reaction mixture was cooled down to 80° C. and 200.0 g (0.2 mol) polyisobutenylsuccinanhydride (PIBSA, Glissopal SA F, BASF) were added and the reaction mixture was heated at 80° C. for additional 3 hours.

The obtained product was a wax with an acid number of 38 mg KOH/g.

Examples 5

A mixture of 190 g (0.1 mol OH) of Pluronic PE3500, 32.6 g (0.2 mol) of isatoic anhydride (IA) and 0.60 g (0.3 wt.-%) of 1,4-Diazabicyclol[2.2.2]octan was heated at 80 to 140° C. until no more carbon dioxide was evolved. Then, the reaction mixture was cooled down to 80° C. and 200.0 g (0.2 mol) Glissopal SA F were added and the reaction mixture was heated at 80° C. for additional 3 hours. The obtained product was a wax with an acid number of 27 mg KOH/g.

Example 6

A mixture of 84 g (0.3 mol OH) of Pluriol A15 TE, 48.9 g (0.3 mol) of isatoic anhydride (IA) and 0.35 g (0.3 wt.-%) of 1,4-Diazabicyclol[2.2.2]octan was heated at 80 to 140° C. until no more carbon dioxide was evolved. Then, the reaction mixture was cooled down to 80° C. and 300.0 g (0.3 mol) of Glissopal SA F were added and the reaction mixture was heated at 80° C. for additional 3 hours. The obtained product was a wax with an acid number of 39 mg KOH/g.

Example 7

A mixture of 50.0 g (0.1 mol OH) of Pluriol® A500 E, 16.3 g (0.1 mol) of isatoic anhydride (IA) and 0.2 g (0.3 wt.-%) of 1,4-Diazabicyclol[2.2.2]octan was heated at 80 to 140° C. until no more carbon dioxide was evolved. Then, the reaction mixture was cooled down to 80° C. and 100.0 g (0.1 mol) of Glissopal SA F were added and the reaction mixture was heated at 150° C. for additional 3 hours. The obtained product was a viscous liquid with an acid number of 5 mg KOH/g.

Example 8

A mixture of 74.0 g (0.1 mol OH) of Lutensol® AT11, 16.3 g (0.1 mol) of isatoic anhydride (IA) and 0.28 g (0.3 wt.-%) of 1,4-Diazabicyclol[2.2.2]octan was heated at 80 to 140° C. until no more carbon dioxide was evolved. Then, the reaction mixture was cooled down to 80° C. and 100.0 g (0.1 mol) of Glissopal SA F were added and the reaction mixture was heated at 160° C. for additional 3 hours. The obtained product was a wax with an acid number of 3 mg KOH/g.

Example 9

A mixture of 84 g (0.3 mol OH) of Pluriol A15 TE, 48.9 g (0.3 mol) of isatoic anhydride (IA) and 0.35 g (0.3 wt.-%) of 1,4-Diazabicyclol[2.2.2]octan was heated at 80 to 140° C. until no more carbon dioxide was evolved. Then, the reaction mixture was cooled down to 80° C. and 300.0 g (0.3 mol) of Glissopal SA F were added and the reaction mixture was heated at 160° C. for additional 3 hours. The obtained product was a wax with an acid number of 4 mg KOH/g.

Performance Testing a) Rheological behavior of mill-base

In order to test the dispersion effect of the obtained samples, resin free pigment concentrates (mill-base) were prepared according to the following formulation recipes F and NF. The mill-base was dispersed in Scandex Shaker for 1 h with the help of glass beads. Afterwards the mill base was filtered and stored at room temperature overnight.

TABLE 2

Preparation of Mill-base Formulations F and NF:

| | Ingredients/Mill-base No. | F | NF |
|---|---|---|---|
| 1) | EFKA-2550 | 1 | 1 |
| 2) | Water | 27.5 | 28 |
| 3) | PEG 200 | 12 | 12 |

TABLE 2-continued

Preparation of Mill-base Formulations F and NF:

| | Ingredients/Mill-base No. | F | NF |
|---|---|---|---|
| 4) | Inventive polymer composition | 5 | 5 |
| 4) | Quadrol L | 0.5 | — |
| 5) | PY42: Bayferrox 3910 LV [g] | 54 | 54 |
| 6) | 2.0 mm glass beads [g] | 100.0 | 100.0 |
| | Total (g) | 200.0 | 200.0 |

EFKA-2550: modified polydimethylsiloxane defoamer of BASF SE
PY42: micronized iron oxide yellow pigment from Lanxess
Quadrol L: a propoxylated ethylene diamine available from BASF A comparative dispersant was synthesized according to example 4 of U.S. Pat. No. 8,247,353. The performance of these dispersants was tested according to Formulations F and NF.

The performance of the polymer compositions of examples 1 to 9 and the performance of the comparative dispersant A were tested by determining the rheological behavior of the Mill-base Formulations F1 and NF1.

The rheological behavior of the mill-bases was measured at 23° C. with a Thermo-Haake RheoStress 600 rheometer under CR-mode with rotation speed of 100 sec$^{-1}$, respectively, using a cone-plate sensor. The mill-bases containing the examples flowed well and their viscosities were comparable or lower than the product of the comparative example. Results are summarized in table 3:

TABLE 3

The dispersion effect in clear coat paint system

| | Viscosity of mill-bases F and NF (mPas) [2] | |
|---|---|---|
| Example | F | NF1 |
| A [1] | 1250 | 1500 |
| 1 | 120 | 250 |
| 2 | 950 | 1050 |
| 3 | 450 | 750 |
| 4 | 650 | 750 |
| 6 | 1200 | 1400 |
| 7 | 1500 | 1550 |

[1] Comparative Example A: example 4 of U.S. Pat. No. 8,247,353.
[2] Measured at constant rotation speed of 100 sec$^{-1}$ b) Performance of the polymer composition in solvent based clear coatings and water based clear coatings The dispersant performance was also tested in clear coating systems with respect to gloss and anti-cratering effect. First, let-down formulations (formulations F2 and F3) based on a clear coating system were prepared.

TABLE 4

Formulation recipe F2 - Organic solvent based clear-coating system

| Ingredient | % b.w. in Formulation |
|---|---|
| Resin 1- | 24.7% |
| Resin 2 | 23.1% |
| Resin 3 | 11.5% |
| Plasticizer | 2.9% |
| Butyl Acetate | 18.9% |
| Xylene | 18.9% |
| Total | 100% |

Resin 1: Saturated polyester resin in Solvent naphtha/Methoxy propanol/Xylene (Setal 173 VS-60) from Nuplex;

Resin 2: Mixture of 64.8 g of a first cellulose acetate butyrate (CAB 381.2) and 25.2 g of a second cellulose acetate butyrate (CAB 381.20) in 255 g butyl acetate and 255 g of xylene, commercially available from Eastman Chemical;

Resin 3: Maprenal MF 650: highly reactive isobutylated melamine-formaldehyde resin, commercially available from Ineos;

Plasticizer: Resamine HF 480: Polyurea plasticizer, Carbamic resin based on butylurethane and formaldehyde, commercially available from Cytec.

TABLE 5

| Formulation recipe F3 - Water based clear-coating system | |
|---|---|
| Ingredient | % b.w. in Formulation |
| Resin 4 | 99.9% |
| Levelling agent | 0.1% |
| Total | 100% |

Resin 4: NeoCryl™ XK-90: 100% acrylic emulsion polymer from DSM;

Levelling agent: EFKA-3570: Levelling and anti-cratering agent for aqueous coatings, neutralized fluorocarbon-modified polyacrylate, commercially available from BASF.

Then, the following paint compositions were prepared by mixing 1.0 g of the respective mill-bases F1 or NF1 with 9.0 g of the clear coating systems F2 or F3, respectively, for 5 minutes at 2000 rpm:

TABLE 6

| | Paint compositions | | | |
|---|---|---|---|---|
| Paint compositions | Mill-base formulations | | Clear coating systems | |
| (PC) | F1 | NF1 | F2 | F3 |
| PC1 | 1.0 g | — | 9.0 g | — |
| PC11 | — | 1.0 g | 9.0 g | — |
| PC2 | 1.0 g | — | — | 9.0 g |
| PC22 | — | 1.0 g | — | 9.0 g |

The paint was applied on polyester film with a 150 µm film thickness.

The gloss of the obtained coatings at 20° angle was determined according to DIN 67530 using a commercial reflectometer (Micro-Tri-Gloss reflectometer from BYK Gardner). The performance was generally very good with satisfactory results, e.g. high gloss in let-down tests. The results are summarized in table 5.

TABLE 5

| Gloss (20°) and crater ranking of paint compositions P1 and P2 | | | | |
|---|---|---|---|---|
| | Gloss (20°) | | | |
| Example | PC1 [2)] | PC11 [2)] | PC2 [2)] | PC22 [2)] |
| A | 46 | 50 | 35 | 41 |
| 1 | 53 | 57 | 42 | 48 |
| 2 | 48 | 50 | 38 | 45 |
| 3 | 51 | 57 | 43 | 50 |
| 4 | 46 | 50 | 36 | 41 |
| 6 | 47 | 50 | 36 | 41 |
| 7 | 52 | 58 | 43 | 42 |

We claim:

1. A polymer composition, which is obtained by reacting
a) a polymer P1 having at least one functional group of the formula (I),

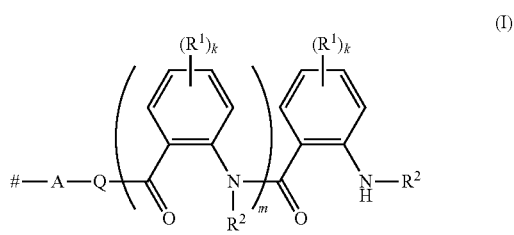

and a polymer backbone B,
where
\# indicates the point of attachment to the terminus and/or to the polymer backbone B of the polymer P1;
k is 0, 1, 2, 3 or 4;
m is 0, 1, 2, 3, 4, 5, 6, 7, 8 or 9;
A is a chemical bond or a divalent moiety selected from the group consisting of $C_1$-$C_6$ alkylene, —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), where the $C_2$-$C_6$ alkylene part is attached to Q;
Q is —O—;
$R^1$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_{20}$ alkyl, $C_1$-$C_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
$R^2$ is selected from the group consisting of hydrogen, —S(=O)$_2$R$^4$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and hetaryl in the aryl, heteroaryl, aryl-$C_1$-$C_4$-alkyl and heteroaryl-$C_1$-$C_4$-alkyl are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
$R^3$ is selected from the group consisting of hydrogen, —S(=O)$_2$R$^4$, $C_1$-$C_{20}$ alkyl, $C_3$-$C_{10}$ cycloalkyl, aryl and heteroaryl, where aryl and hetaryl are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen; and
$R^4$ is selected from the group consisting of OH, —NH$_2$, —NH($C_1$-$C_6$ alkyl), —N($C_1$-$C_6$ alkyl)$_2$, $C_1$-$C_4$ alkyl, $C_1$-$C_4$ alkoxy, aryl and heteroaryl, where aryl and hetaryl are unsubstituted or substituted by 1, 2, 3 or 4 radicals selected from the group consisting of $C_1$-$C_4$ alkyl, $C_1$-$C_4$ alkoxy and halogen;
with
b) a polymer P2 which is a polyolefine succinic anhydride.

2. The polymer composition as claimed in claim 1, wherein the polymer P1 has 1 to 10 functional groups of the formula (I) per polymer molecule.

3. The polymer composition as claimed in claim 1, wherein in the formula (I) the radical $R^2$ is hydrogen.

4. The polymer composition as claimed in claim 1, wherein in the formula (I),
k is 0 or 1;
m is 0 or 1;
A is a chemical bond or a divalent moiety selected from the group consisting of —C(=O)—O—($C_2$-$C_4$ alkylene) and C(=O)—NH—($C_2$-$C_4$ alkylene), where the alkylene part is attached to Q;
$R^1$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$$R^4$, $C_1$-$C_4$ alkyl, $C_1$-$C_4$ alkoxy, halogen, phenyl and pyridyl; and
$R^4$ is selected from the group consisting of —NH$_2$, —NH($C_1$-$C_6$ alkyl), —N($C_1$-$C_6$ alkyl)$_2$ and $C_1$-$C_4$ alkyl.

5. The polymer composition as claimed in claim 1, wherein the polymer P1 has a linear or branched polymer backbone B, and the functional groups are located at the termini of the polymer backbone B.

6. The polymer composition as claimed in claim 1, wherein the polymer backbone B is selected from the group consisting of aliphatic polyesters, aliphatic polyethers, aliphatic polyetheresters, aliphatic polycarbonates and homo- and copolymers which predominately comprise repeating units M1, and the repeating units M1 are selected from polymerized $C_1$-$C_{10}$-alkyl (meth)acrylates, polymerized $C_1$-$C_{10}$-alkyl-(poly-$C_2$-$C_4$-alkyleneglycol) (meth)acrylates and polymerized vinylaromatic hydrocarbon compounds.

7. The polymer composition as claimed in claim 6, wherein the polymer backbone B of the polymer P1 is a poly-($C_2$-$C_4$-alkylene oxide).

8. The polymer composition as claimed in claim 7, wherein the polymer backbone B of the polymer P1 is a $C_1$-$C_4$-alkyl terminated poly(ethylene glycol).

9. The polymer composition as claimed in claim 6, wherein the polymer backbone B of the polymer P1 is an aliphatic polyester or an aliphatic polyetherester.

10. The polymer composition as claimed in claim 1, wherein the polymer P1 has a number-average molecular weight in the range of from 300 to 50000 daltons.

11. The polymer composition as claimed in claim 1, wherein the polymer P2 has a number-average molecular weight in the range of from 300 to 10000 daltons.

12. The polymer composition as claimed in claim 1, wherein the polymer P2 has a saponification number in the range of from 10 to 300 mg KOH/g.

13. The polymer composition as claimed in claim 1, A wherein the polymer P2 comprises less than 20% by weight of polyolefin succinic anhydride with 2 succinic anhydride groups per polyolefin radical.

14. The polymer composition as claimed in claim 1, wherein the polyolefin succinic anhydride is a polyisobutene succinic anhydride.

15. The polymer composition as claimed in claim 1, wherein the polymer P1 and the polymer P2 are reacted in a relative amount such that the molar ratio of functional groups of the formula (I) to the succinic anhydride groups in the polymer P2 is in the range of from 0.1:1 to 10:1.

16. The polymer composition as claimed in claim 1, which has an acid number in the range of from 3 to 500 mg KOH/g.

17. A process for manufacturing the polymer composition of claim 1, comprising:
reacting the polymer P1 with the polymer P2.

18. A liquid composition, comprising:
a fine particulate solid material, selected from the group consisting of pigments and fillers;
the polymer composition of claim 1; and
a liquid diluent,
wherein the fine particulate solid material is dispersed in the liquid diluent, and
the liquid composition is in the form of a dispersion.

19. The liquid composition of claim 18, wherein a weight ratio of the fine particulate solid material to polymer components in the polymer composition is in the range of from 100:1 to 1:50.

20. The liquid composition of claim 18, wherein
i) an amount of the fine particulate solid material is 1 to 70% by weight, based on the total weight of the liquid composition,
ii) an amount of the polymer composition is 0.1 to 50% by weight, based on the total weight of the liquid composition, and
iii) an amount of the liquid diluent is 98.5% or less by weight, based on the total weight of the liquid composition.

21. The liquid composition of claim 18, which is in the form of a mill-base, in the form of an ink or in the form of a coating composition.

22. A polymer composition, which is obtained by reacting
a) a polymer P1 having at least one functional group of the formula (I),

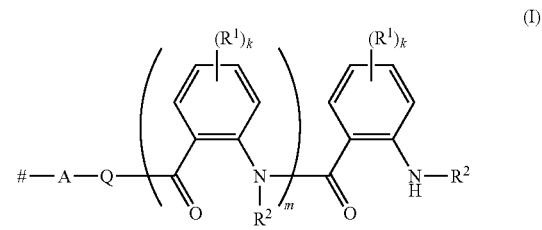

and a polymer backbone B,
where
# indicates the point of attachment to the terminus and/or to the polymer backbone B of the polymer P1;
k is 0, 1, 2, 3 or 4;
m is 0, 1, 2, 3, 4, 5, 6, 7, 8 or 9;
A is a chemical bond or a divalent moiety selected from the group consisting of $C_1$-$C_6$ alkylene, —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), where the $C_2$-$C_6$ alkylene part is attached to Q;
Q is a divalent moiety selected from the group consisting of —O—, —NH— and —S—;
$R^1$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$$R^4$, $C_1$-$C_{20}$ alkyl, $C_1$-$C_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$$R^4$, $C_1$-$C_4$ alkyl, $C_1$-$C_4$ alkoxy and halogen;

$R^2$ is selected from the group consisting of hydrogen, —S(=O)$_2$R$^4$, C$_1$-C$_{20}$ alkyl, C$_3$-C$_{10}$ cycloalkyl, aryl, heteroaryl, aryl-C$_1$-C$_4$-alkyl and heteroaryl-C$_1$-C$_4$-alkyl, where aryl and hetaryl in the aryl, heteroaryl, aryl-C$_1$-C$_4$-alkyl and heteroaryl-C$_1$-C$_4$-alkyl are unsubstituted or substituted by 1, 2, 3 or 4 radicals selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^4$, C$_1$-C$_4$ alkyl, C$_1$-C$_4$ alkoxy and halogen;

$R^3$ is selected from the group consisting of hydrogen, —S(=O)$_2$R$^4$, C$_1$-C$_{20}$ alkyl, C$_3$-C$_{10}$ cycloalkyl, aryl and heteroaryl, where aryl and hetaryl are unsubstituted or substituted by 1, 2, 3 or 4 radicals selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^4$, C$_1$-C$_4$ alkyl, C$_1$-C$_4$ alkoxy and halogen; and $R^4$ is selected from the group consisting of OH, —NH$_2$, —NH(C$_1$-C$_6$ alkyl), —N(C$_1$-C$_6$ alkyl)$_2$, C$_1$-C$_4$ alkyl, C$_1$-C$_4$ alkoxy, aryl and heteroaryl, where aryl and hetaryl are unsubstituted or substituted by 1, 2, 3 or 4 radicals selected from the group consisting of C$_1$-C$_4$ alkyl, C$_1$-C$_4$ alkoxy and halogen;

with b) a polymer P2 which is a polyolefin succinic anhydride, wherein the polymer P2 has a saponification number in the range of from 10 to 300 mg KOH/g.

23. A liquid composition, comprising:
a fine particulate solid material, selected from the group consisting of pigments and fillers;
a polymer composition; and
a liquid diluent,
wherein the fine particulate solid material is dispersed in the liquid diluent, and
the liquid composition is in the form of a dispersion,
and wherein the polymer composition is obtained by reacting
a) a polymer P1 having at least one functional group of the formula (I),

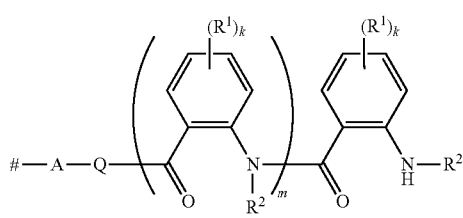

(I)

and a polymer backbone B, where
# indicates the point of attachment to the terminus and/or to the polymer backbone B of the polymer P1;

k is 0, 1, 2, 3 or 4;

m is 0, 1, 2, 3, 4, 5, 6, 7, 8 or 9;

A is a chemical bond or a divalent moiety selected from the group consisting of C$_1$-C$_6$ alkylene, —O—(C$_2$-C$_6$ alkylene), —C(=O)—O—(C$_2$-C$_6$ alkylene), —NR$^3$—(C$_2$-C$_6$ alkylene) and C(=O)—NR$^3$—(C$_2$-C$_6$ alkylene), where the C$_2$-C$_6$ alkylene part is attached to Q;

Q is a divalent moiety selected from the group consisting of —O—, —NH— and —S—;

$R^1$ is independently selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^4$, C$_1$-C$_2$ alkyl, C$_1$-C$_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^4$, C$_1$-C$_4$ alkyl, C$_1$-C$_4$ alkoxy and halogen;

$R^2$ is selected from the group consisting of hydrogen, —S(=O)$_2$R$^4$, C$_1$-C$_{20}$ alkyl, C$_3$-C$_{10}$ cycloalkyl, aryl, heteroaryl, aryl-C$_1$-C$_4$-alkyl and heteroaryl-C$_1$-C$_4$-alkyl, where aryl and hetaryl in the aryl, heteroaryl, aryl-C$_1$-C$_4$-alkyl and heteroaryl-C$_1$-C$_4$-alkyl are unsubstituted or substituted by 1, 2, 3 or 4 radicals selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^4$, C$_1$-C$_4$ alkyl, C$_1$-C$_4$ alkoxy and halogen;

$R^3$ is selected from the group consisting of hydrogen, —S(=O)$_2$R$^4$, C$_1$-C$_{20}$ alkyl, C$_3$-C$_{10}$ cycloalkyl, aryl and heteroaryl, where aryl and hetaryl are unsubstituted or substituted by 1, 2, 3 or 4 radicals selected from the group consisting of —OH, —COOH, —COOCH$_3$, —NH$_2$, —NH(C$_1$-C$_6$ alkyl), —N(C$_1$-C$_6$ alkyl)$_2$, —NO$_2$, —S(=O)$_2$R$^4$, C$_1$-C$_4$ alkyl, C$_1$-C$_4$ alkoxy and halogen; and $R^4$ is selected from the group consisting of OH, —NH$_2$, —NH(C$_1$-C$_6$ alkyl), —N(C$_1$-C$_6$ alkyl)$_2$, C$_1$-C$_4$ alkyl, C$_1$-C$_4$ alkoxy, aryl and heteroaryl, where aryl and hetaryl are unsubstituted or substituted by 1, 2, 3 or 4 radicals selected from the group consisting of C$_1$-C$_4$ alkyl, C$_1$-C$_4$ alkoxy and halogen;

with b) a polymer P2 which is a polyolefin succinic anhydride.

* * * * *

UNITED STATES PATENT AND TRADEMARK OFFICE
CERTIFICATE OF CORRECTION

PATENT NO. : 10,131,750 B2
APPLICATION NO. : 15/524144
DATED : November 20, 2018
INVENTOR(S) : Huiguang Kou et al.

Page 1 of 1

It is certified that error appears in the above-identified patent and that said Letters Patent is hereby corrected as shown below:

In the Specification

Column 3, Line 16, "≥$NO_2$, ≥$S(=O)_2R^4$," should read -- -$NO_2$, -$S(=O)_2R^4$, --;

Column 14, Lines 35-36, "-$O(=O)$-O-($C_2$-$C_6$ alkylene)," should read -- -$C(=O)$-O-($C_2$-$C_6$ alkylene),--;

In the Claims

Column 33, Line 53, Claim 13, "in claim 1, A" should read --in claim 1,--.

Signed and Sealed this
Eighth Day of October, 2019

Andrei Iancu
*Director of the United States Patent and Trademark Office*